(12) United States Patent
Ishihara et al.

(10) Patent No.: US 8,711,869 B2
(45) Date of Patent: Apr. 29, 2014

(54) MESSAGE TRANSFER APPARATUS, OUTPUT METHOD, AND COMPUTER PROGRAM PRODUCT

(75) Inventors: Takeshi Ishihara, Kanagawa (JP); Daisuke Ajitomi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 678 days.

(21) Appl. No.: 12/405,411

(22) Filed: Mar. 17, 2009

(65) Prior Publication Data

US 2010/0054124 A1 Mar. 4, 2010

(30) Foreign Application Priority Data

Sep. 1, 2008 (JP) ................................. 2008-223970

(51) Int. Cl.
*H04L 12/28* (2006.01)

(52) U.S. Cl.
USPC ............ 370/401; 370/230; 370/248; 370/254

(58) Field of Classification Search
USPC .................. 370/230, 248, 254, 401
See application file for complete search history.

(56) References Cited

U.S. PATENT DOCUMENTS

| | | | | | |
|---|---|---|---|---|---|
| 5,588,003 | A | * | 12/1996 | Ohba et al. ..................... | 370/468 |
| 6,449,251 | B1 | * | 9/2002 | Awadallah et al. ........... | 370/229 |
| 6,658,457 | B2 | * | 12/2003 | Nishikawa et al. ........... | 709/206 |
| 7,471,690 | B2 | * | 12/2008 | Asano et al. ................... | 370/401 |
| 7,672,319 | B1 | * | 3/2010 | Heath et al. ................... | 370/401 |
| 7,817,554 | B2 | | 10/2010 | Skog et al. | |
| 2002/0021699 | A1 | * | 2/2002 | Hsiao ........................ | 370/395.21 |
| 2007/0088981 | A1 | * | 4/2007 | Noble et al. ..................... | 714/26 |
| 2007/0104169 | A1 | * | 5/2007 | Polson .......................... | 370/338 |
| 2008/0013545 | A1 | | 1/2008 | Ono et al. | |
| 2009/0059937 | A1 | * | 3/2009 | Kanada ........................ | 370/401 |

FOREIGN PATENT DOCUMENTS

| | | |
|---|---|---|
| JP | 2001-358771 | 12/2001 |
| JP | 2003-051834 | 2/2003 |
| JP | 2006-174350 | 6/2006 |
| JP | 2006-304083 | 11/2006 |
| JP | 2008-022312 | 1/2008 |
| JP | 2008-035510 | 2/2008 |
| JP | 2008-505530 | 2/2008 |
| JP | 2008-199675 | 8/2008 |

OTHER PUBLICATIONS

Japanese Office Action for Japanese Patent Application No. 2008-223970 mailed on Nov. 6, 2012.
Japanese Office Action for Japanese Patent Application No. 2008-223970 mailed on Apr. 17, 2012.

* cited by examiner

*Primary Examiner* — Ricky Ngo
*Assistant Examiner* — Dewanda Samuel
(74) *Attorney, Agent, or Firm* — Amin, Turocy & Watson, LLP

(57) ABSTRACT

A packet processor transfers a message received by a first (second) port to a second (first) port. When first specific information is included in the received message, a QoS terminal detector detects a communication terminal, which is a sender of the message received by the first port or a destination of the message received by the second port, as a QoS terminal requesting application of QoS. When the QoS terminal does not satisfy a preset connection condition associated with the QoS terminal connectable to the first port via a first network, an output unit outputs information indicating that the connection condition is not satisfied.

21 Claims, 12 Drawing Sheets

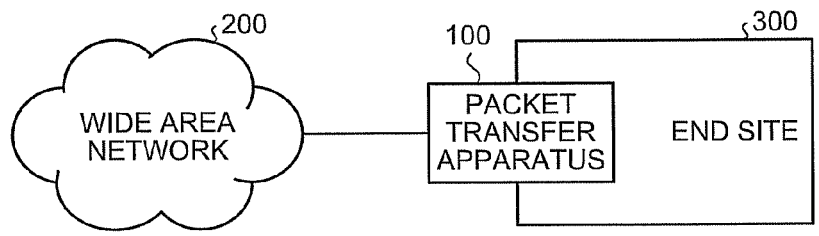
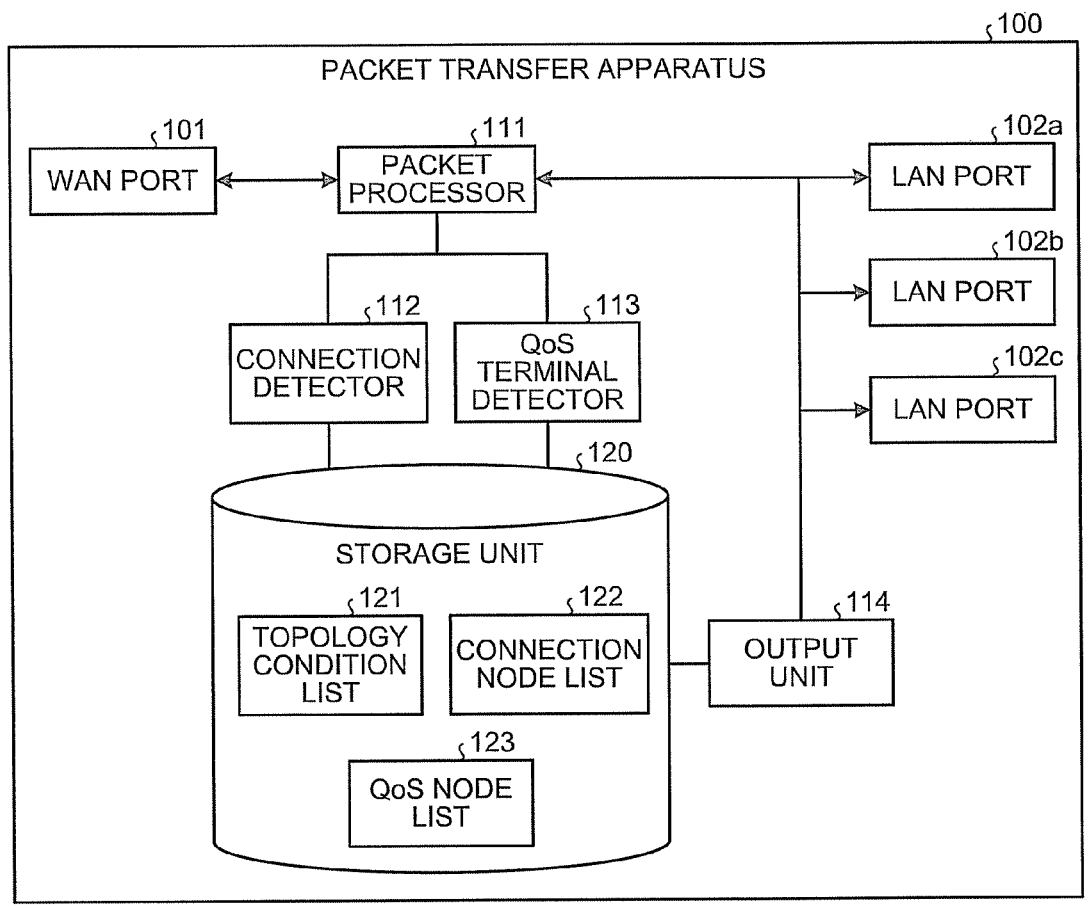

FIG.3

| NUMBER | CONDITION | |
|---|---|---|
| 1 | QoS COMMUNICATION NODE AND BEST-EFFORT COMMUNICATION NODE CANNOT BE CONNECTED TOGETHER TO LAN PORT 1 | ~301 |
| 2 | ONLY ONE NODE CAN BE CONNECTED TO LAN PORT 1 | ~302 |

| NODE IDENTIFIER | PORT IDENTIFIER |
|---|---|
| AA:BB:CC:DD:EE:FF | 1 |
| 00:11:22:33:44:55 | 2 |
| 12:34:56:78:90:ab | 2 |
| cd:ef:01:23:45:67 | 3 |

| NODE IDENTIFIER | PORT IDENTIFIER |
|---|---|
| AA:BB:CC:DD:EE:FF | 1 |

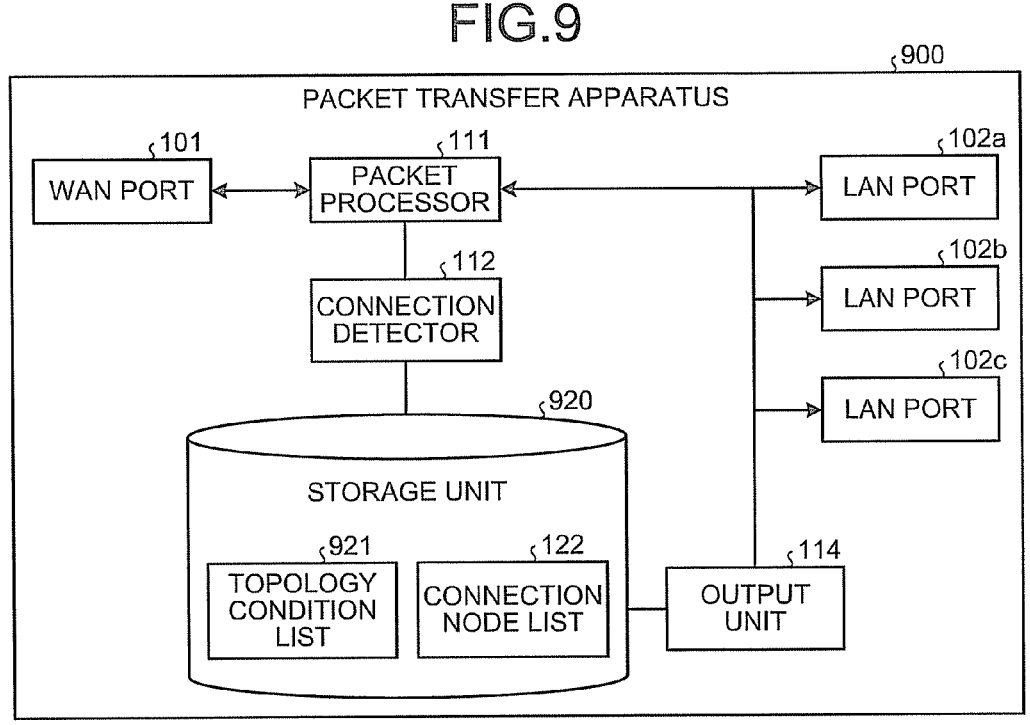
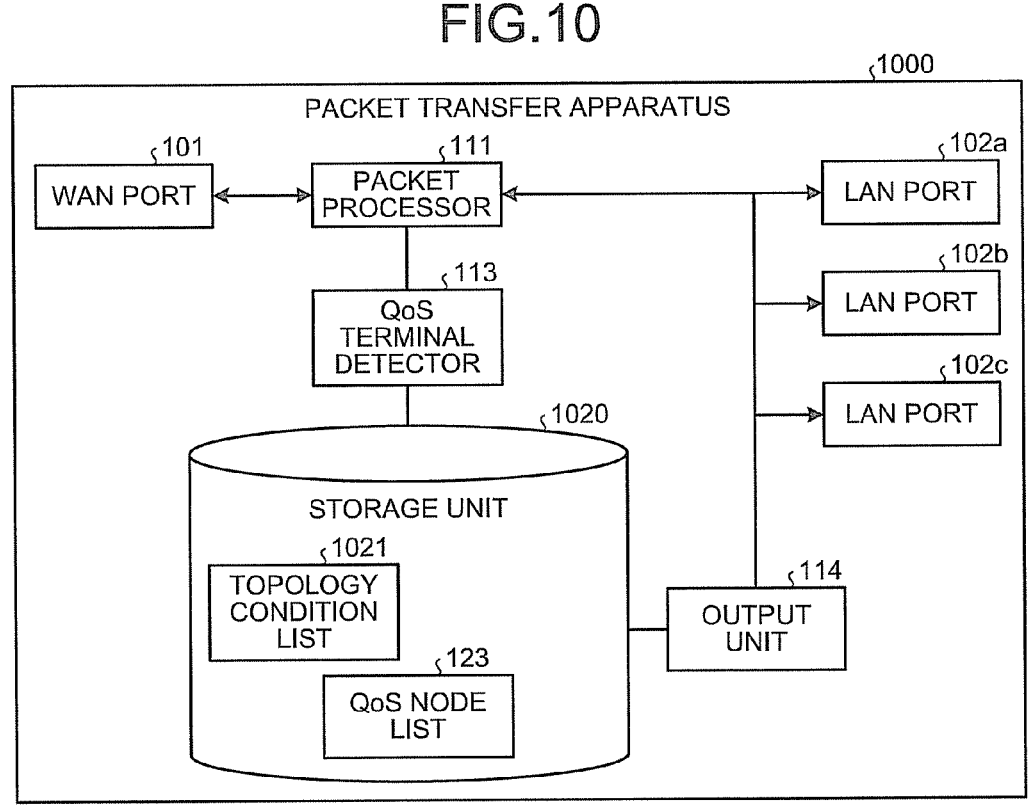

MESSAGE TRANSFER APPARATUS, OUTPUT METHOD, AND COMPUTER PROGRAM PRODUCT

CROSS-REFERENCE TO RELATED APPLICATIONS

This application is based upon and claims the benefit of priority from the prior Japanese Patent Application No. 2008-223970, filed on Sep. 1, 2008; the entire contents of which are incorporated herein by reference.

BACKGROUND OF THE INVENTION

1. Field of the Invention

The present invention relates to a message transfer apparatus that transfers a message while ensuring Quality of Service (QoS), an output method, and a computer program product.

2. Description of the Related Art

The QoS has been known as a technique that enables to ensure transmission quality in a network. In an IP network, the QoS is applied at the time of transmitting high-definition movie or speech. Accordingly, a network satisfying certain criteria with respect to quality conditions such as a transmission band, a transmission delay, and a packet discarding rate can be constructed.

Generally, the QoS is realized by a communication terminal (node) equipped with a QoS function. For example, when the node transmits a packet to the network and when the node processes the packet, priority of processing is determined for each packet. Because the packet is processed in decreasing order of the priority, the QoS with respect to a specific communication can be realized.

To make the QoS work correctly and ensure desired communication quality, processing for detecting a packet to be applied with the QoS and determination of a rule to be applied to the packet are essential.

JP-A 2008-35510 (KOKAI) proposes a technique that enables to start application of the QoS automatically when a PLC (power line communication) adapter detects a packet to be applied with the QoS in a home network using the PLC. JP-A 2008-35510 (KOKAI) also discloses that when the QoS cannot be applied, that effect is notified, for example, by blinking a light emitting diode (LED) of the PLC adapter.

JP-A 2006-174350 (KOKAI) proposes a technique that enables to realize the QoS by using an identification condition and a processing rule of a packet group preset or downloaded from a network to detect a packet satisfying the identification condition from packets passing through a node, and apply the processing rule to the detected packet.

However, according to the conventional methods disclosed in JP-A 2008-35510 (KOKAI) and JP-A 2006-174350 (KOKAI), there is a case that the QoS cannot be applied appropriately to a node requesting application of the QoS. This is because applicability of the QoS is determined mainly according to an internal condition of an apparatus that realizes the QoS such as an available band or an available storage area, in the conventional methods.

That is, in such methods, applicability of the QoS cannot be determined according to an external condition of the node, for example, how the network to which a node requesting application of the QoS belongs is connected to other nodes. Therefore, the QoS satisfying the request may not be realized depending on operating states of other nodes connected to the same network.

For example, it is assumed that a local area network (LAN) formed of the Ethernet (registered trademark) is connected to a wired area network by a router having the QoS function. In this case, when communication with the QoS being ensured arrives from the wide area network, the router can transfer the communication to the LAN while maintaining the QoS. However, when a node transmitting a large number of packets is connected to the LAN, communication disturbance is likely to occur due to the packets in the LAN, even if the router transfers the packet in an appropriate condition. As a result, the QoS cannot be applied.

Thus, when the node which performs QoS communication and the node which performs best-effort communication are connected together, each node may not be able to obtain desired communication quality. Further, not only the QoS cannot be applied, but also the best-effort communication may be completely inhibited in a case that many QoS nodes are connected.

Such problems occur because the QoS is set regardless of a topology of the LAN. Particularly, the problem is that the node performs communication in an environment, which is not assumed by a service provider who provides service by using the QoS communication.

Further, users having no technical knowledge of the network and computers can hardly understand that there is a problem in the network topology. For example, the user can hardly investigate the cause of a situation in which the movie and speech are disturbed, although all the nodes are connected to the LAN in the same manner and communication is possible.

SUMMARY OF THE INVENTION

According to one aspect of the present invention, a message transfer apparatus includes a first port to be connected to a first network to which a communication terminal is connected; a second port to be connected to a second network; a message processor that transfers a message received by the first port to the second port, and transfers a message received by the second port to the first port; a Quality of Service (QoS) terminal detector that determines whether first specific information capable of specifying a message type is included in the received message, and when the first specific information is included therein, detects the communication terminal, which is a sender of the message received by the first port or a destination of the message received by the second port, as a QoS terminal requesting application of QoS; a storage unit that stores a connection condition associated with the QoS terminal connectable to the first port via the first network; and an output unit that determines whether the QoS terminal satisfies the connection condition, and when the QoS terminal does not satisfy the connection condition, outputs output information indicating that the connection condition is not satisfied.

According to another aspect of the present invention, an output method includes transferring a massage received by a first port to be connected to a first network to which a communication terminal is connected, to a second port to be connected to a second network, and transferring a massage received by the second port to the first port; determining whether first specific information capable of specifying a message type is included in the received message; detecting the communication terminal, which is a sender of the message received by the first port or a destination of the message received by the second port, as a QoS terminal requesting application of QoS, when the first specific information is included therein; determining whether the QoS terminal satisfies a connection condition associated with the QoS terminal connectable to the first port via the first network; and outputting output information indicating that the connection condition is not satisfied when the QoS terminal does not satisfy the connection condition.

According to still another aspect of the present invention, a message transfer apparatus includes a first port to be connected to a first network to which a communication terminal is connected; a second port to be connected to a second network; a message processor that transfers a message received by the first port to the second port, and transfers a message received by the second port to the first port; a connection detector that determines whether first specific information capable of specifying a message type is included in the message received by the first port, and when the first specific information is included therein, detecting the communication terminal, which is a sender of the message received by the first port, as a communication terminal connected to the first port via the first network; a storage unit that stores a connection condition associated with the communication terminal connectable to the first port via the first network; and an output unit that determines whether the communication terminal determined to be connected satisfies the connection condition, and when the communication terminal does not satisfy the connection condition, outputting output information indicating that the connection condition is not satisfied.

According to still another aspect of the present invention, an output method includes transferring a massage received by a first port to be connected to a first network to which a communication terminal is connected, to a second port to be connected to a second network, and transferring a massage received by the second port to the first port; determining whether specific information capable of specifying a message type is included in the message received by the first port; detecting the communication terminal, which is a sender of the message received by the first port, as a communication terminal connected to the first port via the first network, when the specific information is included therein; determining whether the communication terminal determined to be connected satisfies a preset connection condition associated with the communication terminal connectable to the first port via the first network; and outputting output information indicating that the connection condition is not satisfied when the communication terminal does not satisfy the connection condition.

A computer program product according to still another aspect of the present invention causes a computer to perform the methods according to the present invention.

BRIEF DESCRIPTION OF THE DRAWINGS

FIG. 1 is a diagram of a mode of a communication system according to a first embodiment of the present invention;

FIG. 2 is a block diagram of a packet transfer apparatus according to the first embodiment;

FIG. 3 is a diagram illustrating one example of a data structure of a topology condition list;

FIG. 4 is a diagram illustrating one example of a data structure of a connection node list;

FIG. 5 is a diagram illustrating one example of a data structure of a QoS node list;

FIG. 9 is a block diagram of a packet transfer apparatus according to a second embodiment of the present invention;

FIG. 10 is a block diagram of a packet transfer apparatus according to a third embodiment of the present invention;

DETAILED DESCRIPTION OF THE INVENTION

Figure 6:
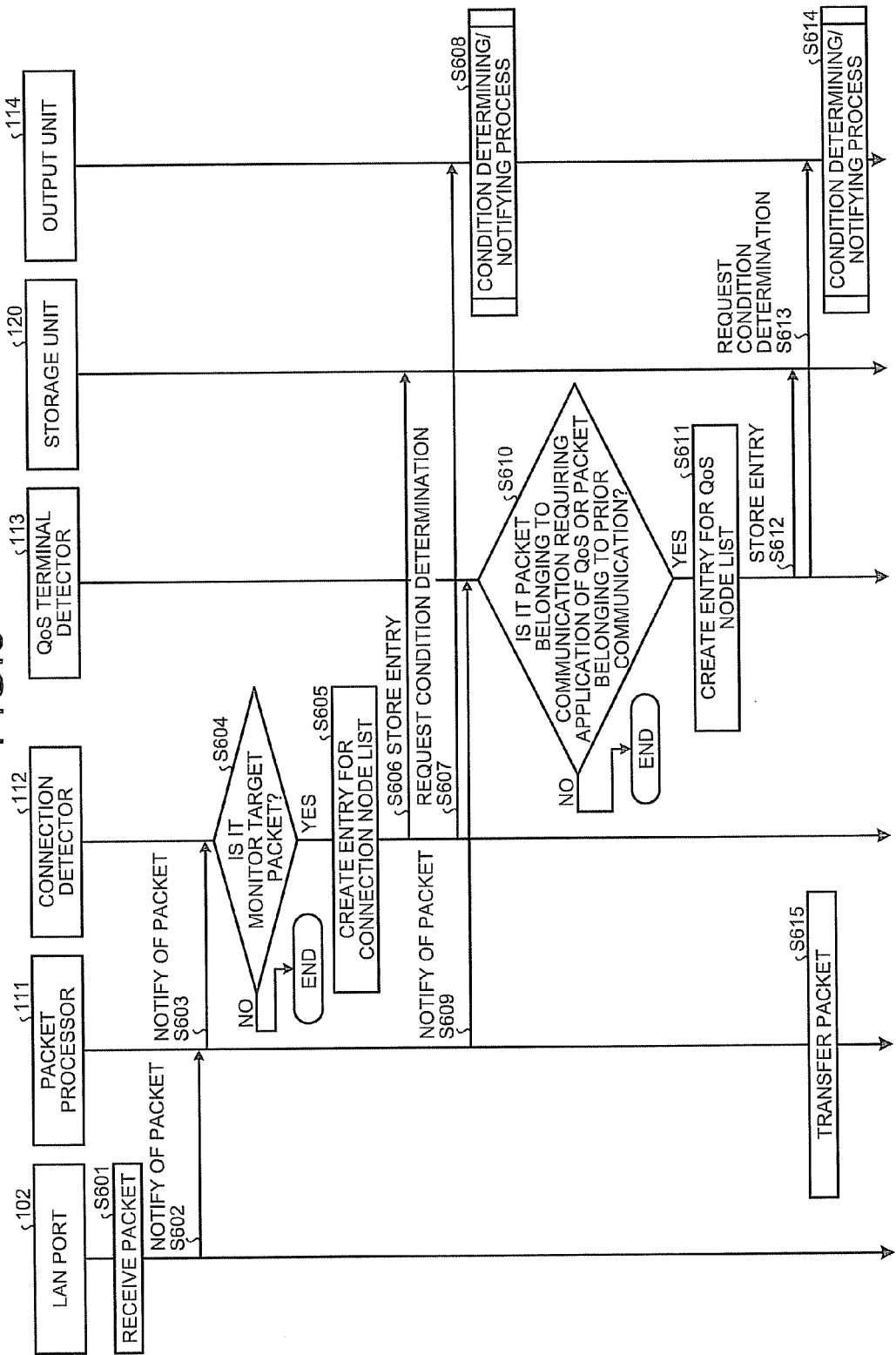
FIG. 6 is a sequence diagram of an overall flow of a message transfer process in the first embodiment.

Exemplary embodiments of an apparatus, a method, and a computer program product according to the present invention are explained below in detail with reference to the accompanying drawings.

A message transfer apparatus according to a first embodiment of the present invention detects connection of a communication terminal (node) upon reception of a predetermined message (packet), and detects a node requesting application of the QoS (hereinafter, "QoS node"). The message transfer apparatus then determines whether the detected node and QoS node satisfy a preset connection condition, and when the nodes do not satisfy the condition, notifies the connected node of that effect.

As shown in FIG. 1, a packet transfer apparatus 100 according to the first embodiment connects an end site 300, which is a network connected with nodes, to a wide area network 200.

The packet transfer apparatus 100 can include, for example, a home gateway (HGW) installed at a boundary between the end site 300 constituted in a company or a home and the wide area network 200 provided by a telecommunications carrier. An applicable apparatus is not limited to the HGW, and any apparatus including a function of transferring a message (packet) from the QoS node can be applied.

The wide area network 200 connects to a server or the like (not shown) that distributes contents such as movie and speech. The nodes in the end site 300 can receive various services by accessing the server of the wide area network 200 via the packet transfer apparatus 100.

A configuration of the packet transfer apparatus 100 is explained next with reference to FIG. 2. As shown in FIG. 2, the packet transfer apparatus 100 includes a wide area network (WAN) port 101, LAN ports 102a to 102c, a storage unit 120, a packet processor 111, a connection detector 112, a QoS terminal detector 113, and an output unit 114.

The WAN port 101 is for connecting to the wide area network 200. The LAN ports 102a to 102c are for connecting to the end site 300. The nodes included in the end site 300 are connected to any one of the LAN ports 102a to 102c. The WAN port 101 and the LAN ports 102 need only to support an appropriate communication system connectable to the wide area network 200 and the end site 300, respectively.

For example, the LAN port 102 corresponding to the IEEE (Institute of Electrical and Electronics Engineers) 802.3 Standard such as 100 BASE-TX or 1000 BASE-T, or the IEEE 802.11 Standard such as 802.11b/g can be used. To the WAN port 101, the IEEE 802.3 Standard can be also applied. The WAN port 101 can be constituted to use a logical interface such as PPP (Point to Point Protocol) over Ethernet.

The LAN ports 102a to 102c include the same configuration, and thus are sometimes referred to simply as "LAN port 102" below. The number of the LAN ports 102 is not limited to three. A uniquely identifiable port identifier is allocated to each of the LAN ports 102. It is assumed that 1, 2, and 3, which are serial numbers managed in the packet transfer apparatus 100, are respectively allocated to the LAN ports 102a, 102b, and 102c as the port identifiers for explanations below. Any information can be used as the port identifier so long as it can identify each LAN port 102.

In FIG. 2, the port realizing the QoS and the normal port are not distinguished from each other; however, these can be distinguished. A repeater such as a switching hub can be incorporated in front of the LAN port 102 that can be managed directly.

The storage unit 120 stores therein data used in various processes performed by the packet transfer apparatus 100. For example, the storage unit 120 stores therein a topology condition list 121 that defines conditions (connection conditions) associated with connection modes of the node required for applying the QoS. The storage unit 120 also stores therein a connection node list 122 including information of the node detected by the connection detector 112 described later, and a QoS node list 123 including information of the node detected by the QoS terminal detector 113.

As shown in FIG. 3, the storage unit 120 stores therein the topology condition list 121 in which the number and the condition are associated with each other. The number is provided for the sake of explanation. In FIG. 3, two conditions of "QoS communication node and best-effort communication node cannot be connected together to the LAN port 1" and "only one port can be connected to the LAN port 1" are specified. The LAN port 1 means a LAN port with the port identification 1 (LAN port 102a).

For the sake of explanation, the topology condition is described in a natural language in FIG. 3. It is assumed here that the topology condition is appropriately converted to an available format by the packet transfer apparatus 100 and stored in the topology condition list 121.

The topology condition list 121 can be set by a method described below. In a first method, a user of the packet transfer apparatus 100 sets the condition via an operating interface (not shown). The user can set the condition based on a connection rule specified by the wide area network 200, or the user can freely set the condition based on his/her own standard.

In a second method, the condition is set by downloading the condition from a server device in the wide area network 200. When there is the plurality of wide area networks 200 to be connected and there is a plurality of servers from which the condition is downloaded, the conditions are downloaded from the servers, respectively, and the plural conditions can be logically combined to generate the condition to be set. Alternatively, one server is selected from the servers, and the condition specified by the selected server can be used.

In a third method, at least one preset condition is set in the storage unit 120 beforehand. For example, setting for a specific Internet service provider (ISP) is prepared beforehand, and the condition corresponding to the ISP selected by the user or the ISP dynamically determined based on a domain name or the like of a connection destination can be selected.

As shown in FIG. 4, the connection node list 122 includes node identifiers capable of identifying the nodes and port identifiers of the LAN ports 102 that detect connection.

An example shown in FIG. 4 indicates that one node is connected to the LAN port 102a with the port identifier 1, two nodes are connected to the LAN port 102b with the port identifier 2, and one node is connected to the LAN port 102c with the port identifier 3.

As shown in FIG. 5, the QoS node list 123 includes a node identifier of the node that performs communication applying the QoS, and a port identifier of the port to which the node is connected.

In FIGS. 4 and 5, an example in which a media access control (MAC) address of the node is used as the node identifier is shown. The node identifier is not limited to the MAC address, and any information can be used so long as it can identify the node.

The connection node list 122 and the QoS node list 123 are stored together in the storage unit 120; however, these lists can be stored in separate storage units. One connection node list 122 and one QoS node list 123 are created with respect to all LAN ports 102; however, separate lists can be created for each LAN port 102. When one list is created with respect to all the ports, correspondence with the port identifiers needs to be maintained. A case that the connection node list 122 and the QoS node list 123 are managed in one storage unit 120 is explained as an example.

The storage unit 120 can be formed of any generally used recording medium such as a hard disk drive (HDD), an optical disk, a memory card, or a random access memory (RAM).

Returning to FIG. 2, the packet processor 111 processes the packets having arrived at the WAN port 101 and the LAN ports 102a to 102c. For example, the packet processor 111 receives the packet having arrived at the WAN port 101, and transfers the received packet to the LAN port 102 connected with the node corresponding to a destination address specified in the packet. The packet processor 111 also receives the packet having arrived at the LAN port 102, and transfers the received packet to the WAN port 101, when an address of the server or the like in the wide area network 200 is specified in the packet.

The connection detector 112 detects the node connected to the LAN port 102. Specifically, the connection detector 112 monitors the packet received by the LAN port 102 to detect a predetermined packet associated with the connection of the node to the LAN port 102. The connection detector 112 monitors the packet to be transmitted by the node prior to communication. More specifically, the connection detector 112 monitors an IPv4 address resolution protocol (ARP) packet or an IPv6 Neighbor Discovery packet. When having received the packet to be monitored (hereinafter, "monitor target packet"), the connection detector 112 detects that a sender node of the received packet is connected.

The QoS terminal detector 113 monitors the packet transferred by the packet processor 111, to detect the QoS node from the nodes connected to the LAN port 102 according to whether preset specification information capable of specifying a message type is included. A QoS-node detecting process performed by the QoS terminal detector 113 will be described later in detail.

The output unit 114 determines whether the node detected by the connection detector 112 and the QoS node detected by the QoS terminal detector 113 satisfy the condition stored in the topology condition list 121. When the nodes do not satisfy the condition, the output unit 114 outputs information indicating that the nodes do not satisfy the condition. For example, the output unit 114 sends, as the output information, a notification message indicating that the nodes do not satisfy the condition to the node whose connection has been detected via the LAN port 102. The output unit 114 directly connects to the LAN port 102 to transmit the notification message. The output unit 114 can be adapted to transmit the notification message via the packet processor 111. That is, the notification message can be sent via the WAN port 101.

The output unit 114 can output the output information by blinking an LED (not shown) or the like included in the packet transfer apparatus 100. The packet transfer apparatus 100 can include a display (display unit) other than the LED, and the output unit 114 outputs the output information to the interface.

The packet transfer apparatus 100 can include a processor together with the display interface and a user interface usable for setting, for controlling these interfaces.

A message transfer process performed by the packet transfer apparatus 100 according to the first embodiment is explained next with reference to FIG. 6.

As shown in FIG. 6, in the packet transfer apparatus 100 of the first embodiment, the packet processor 111 not only transfers the received packet (Steps S601, S602, and S615), but additionally performs a process for determining whether the node connected to the LAN port 102 satisfies the connection condition for applying the QoS by using the received packet, to send a determination result (Steps S603 to S614).

The added process mainly includes two parts. A first half (Steps S603 to S608) is a connection-node detecting process for detecting the node connected to the LAN port 102. A latter half (Steps S609 to S614) is a QoS-node detecting process in which start of communication requiring the QoS or communication prior to the communication requiring the QoS by the node connected to the LAN port 102 is detected, to thereby detect that the connected node is the QoS node.

When any one of the LAN ports 102 receives a packet (Step S601), the packet processor 111 is notified of the received packet (Step S602). The packet processor 111 notifies the connection detector 112 of the received packet (Step S603).

The connection detector 112 determines whether the received packet is the monitor target packet (Step S604). For example, the connection detector 112 determines whether the received packet is the IPv4 ARP packet or the IPv6 Neighbor Discovery packet preset as the monitor target packet.

The connection detector 112 can determine whether the received packet is the ARP packet by determining, for example, whether an Ethernet Type field is "0x0806". The connection detector 112 can also determine whether the packet is the ARP packet by determining whether a destination MAC address in header information is "ff:ff:ff:ff:ff:ff". The connection detector 112 can determine that the packet is the IPv6 Neighbor Discovery packet, for example, by confirming that ICMPv6 Type has a specific value. Thus, the connection detector 112 determines whether the received packet is a packet of a specific protocol by determining whether specific information (specific protocol information) set for each protocol to be detected is included therein.

When having determined that the packet is not the monitor target packet (NO at Step S604), the connection detector 112 finishes the connection-node detecting process and prepares for reception of the next packet.

When the packet is the monitor target packet (YES at Step S604), the connection detector 112 creates an entry for adding the packet to the connection node list 122 shown in FIG. 4 (Step S605). As described above, each entry in the connection node list 122 includes the node identifier and the port identifier. The two identifiers are extracted or identified by the packet processor 111 and are transmitted to the connection detector 112.

The packet processor 111 can extract the MAC address from a sender MAC address field included in the Ethernet header of the received packet. At the time of receiving the packet from the LAN ports 102*a* to 102*c*, the packet processor 111 can specify the LAN port 102, which has transmitted the packet, by providing a separate receiving unit (for example, a reception packet queue) to each of the LAN ports 102*a* to 102*c*.

After having created the entry, the connection detector 112 stores the created entry in the storage unit 120 (Step S606).

When having detected a node already registered in the storage unit 120, the connection detector 112 overwrites the existing entry, thereby enabling to prevent the same entry from being created again. Before creating the entry, the connection detector 112 can confirm whether the detected node has been registered already in the storage unit 120, so that the entry creating and storing processes (Steps S605 and S606) can be omitted when the detected node has been already registered.

Upon completion of the registration of the node to the connection node list 122, the connection detector 112 requests the output unit 114 to perform condition determination (Step S607). The condition determination means determination of whether the detected node satisfies the condition in the topology condition list 121. Upon reception of the request from the connection detector 112, the output unit 114 executes a condition determining/notifying process in which the condition determination is performed, and when the node does not satisfy the condition, the output unit 114 notifies the detected node of that effect (Step S608). The condition determining/notifying process will be described later in detail.

The packet processor 111 then sends the received packet to the QoS terminal detector 113 (Step S609).

The packet processor 111 extracts the node identifier and the port identifier and sends these identifiers to the QoS terminal detector 113, in the same manner as the connection-node detecting process in the first half. The packet processor 111 can use the node identifier different from that used in the connection-node detecting process, in the QoS-node detecting process in the latter half. For example, the MAC address can be used in the connection-node detecting process, and an IP address can be used in the QoS-node detecting process. This is because it is more efficient in the connection-node detecting process to extract the MAC address to detect, for example, the ARP packet; whereas it may be more efficient in other cases to extract the IP address.

However, when different node identifiers are used, a mechanism for holding the correspondence between these identifiers needs to be provided so that the output unit 114 can access thereto. As the mechanism, for example, an ARP table can be used in the case of correspondence between the MAC address and the IPv4 address. A neighboring node table can be used in the case of correspondence between the MAC address and the IPv6 address.

The QoS terminal detector 113 determines whether the received packet belongs to the communication requiring application of the QoS or the packet belongs to the communication prior to the communication requiring application of the QoS (Step S610). Details of the determination performed at Step S610 will be described later.

When it is determined that the received packet does not belong to the communication requiring application of the QoS or the communication prior to the communication requiring application of the QoS (NO at Step S610), the QoS terminal detector 113 finishes the QoS-node detecting process to prepare for reception of the next packet.

When it is determined that the received packet belongs to the communication requiring application of the QoS or the communication prior to the communication requiring application of the QoS (YES at Step S610), the QoS terminal detector 113 creates an entry for adding the packet to the QoS node list 123 shown in FIG. 5 (Step S611). After having created the entry, the QoS terminal detector 113 stores the created entry in the storage unit 120 (Step S612).

The information of the node required for the QoS node list 123 is extracted from each header included in the received packet. A part of information may not be included in the received packet, and thus in this case, the information accumulated beforehand in the packet transfer apparatus 100 is used as required.

For example, such a case is considered that the MAC address is used as the node identifier in the QoS node list 123 and that the QoS-node detecting process is executed with respect to the packet received from the WAN port 101. Generally, the MAC address can be obtained from the Ethernet header. However, in this case, the MAC address of the node at the destination of the packet, that is, the MAC address of the node, which connects to the LAN port 102 and becomes an end point of the QoS communication, is not included in the received packet. Accordingly, the QoS terminal detector 113 needs to obtain a recipient IP address from the received packet and obtain the MAC address corresponding to the obtained IP address by using the ARP table or the neighboring node table installed in the packet transfer apparatus 100.

In this case, the identifier of the WAN port 101 cannot be used as the port identifier. Therefore, the QoS terminal detector 113 needs to specify the port identifier of the LAN port 102 connected with the recipient node by referring to, for example, the ARP table.

When registration of the node to the QoS node list 123 is complete, the QoS terminal detector 113 requests the output unit 114 to determine the condition (Step S613). The requested output unit 114 executes the condition determining/notifying process in the same manner as at Step S608 (Step S614). The details of the condition determining/notifying process will be described later.

After the condition determining/notifying process, the packet processor 111 transfers the received packet to the destination specified by the packet (Step S615). The packet processor 111 can be constituted not to transfer the packet, when it is determined that the packet does not satisfy the condition in the condition determining/notifying process.

In FIG. 6, the QoS-node detecting process is executed after the connection-node detecting process; however, an execution sequence is not limited thereto, and the QoS-node detecting process can be executed first, or the both processes can be executed in parallel.

In FIG. 6, the packet processor 111 transmits the received packet directly to the connection detector 112 and the QoS terminal detector 113, and the connection detector 112 and the QoS terminal detector 113 respectively execute the determination whether the received packet is a predetermined packet. However, the packet processor 111 can include a packet filter to determine whether the received packet is the predetermined packet by using the packet filter.

Details of the process for detecting the packet belonging to the communication requiring application of the QoS or the packet belonging to the communication prior to the communication requiring application of the QoS at Step S610 are explained next.

The communication requiring application of the QoS is a communication in which application of the QoS is desired or required beforehand by an application that uses the communication. For example, Voice over Internet protocol (VoIP) application for transferring speech information on a real time basis and Internet protocol television (IPTV) application for receiving movie correspond to such an application.

The QoS terminal detector 113 analyzes a packet header to obtain a protocol and a port number, and specifies that it is a packet in the communication used by such an application. That is, when the protocol and the port number obtained by the analysis match a specific IP address and a specific port number preset as the protocol and the port number used in the VoIP application or the IPTV application, the QoS terminal detector 113 determines that the packet belongs to the communication requiring application of the QoS. For example, a real-time transport protocol (RTP) and a real time streaming protocol (RTSP) correspond to such a protocol. When the received packet is formed by using the RTP or RTSP, the QoS terminal detector 113 can determine that the packet is handled by the VoIP application or the IPTV application.

In the case of the protocol used for various purposes, the data to be transmitted may not be specified only by an IP header or a header in a transport layer. For example, HTTP is also used at the time of transmitting the speech data or the moving image data, as well as text data or image data. On the other hand, a transmission data format can be obtained by referring to a content-type field of the HTTP header. Therefore, the QoS terminal detector 113 can determine whether the communication requires application of the QoS by referring to the content-type field. For example, the QoS terminal detector 113 determines that the communication requires application of the QoS, when a set value in the content-type field is a specific value indicating the speech data or the moving image data.

When the packet does not include the content-type field, it is required to determine whether it is the communication requiring application of the QoS based on information other than the field information. For example, the content-type field is not included in a request packet sent by a node in the end site 300 for requesting the server in the wide area network 200 to transmit the movie. Instead, the request packet includes a uniform resource identifier (URI) for identifying the data. Normally, the URI includes a specific character string capable of specifying a data format of the data, such as "mpg" in the case of MPEG motion picture and "mp3" in the case of MP3 speech. Accordingly, the QoS terminal detector 113 can be constituted to determine whether the communication requires application of the QoS based on the request packet by searching for the specific character string.

On the other hand, the communication prior to the communication requiring application of the QoS is the one used for transmitting or receiving a predetermined message or for accessing a predetermined server, prior to the communication requiring application of the QoS. The communication prior to the communication requiring application of the QoS includes a communication that explicitly requests the communication requiring application of the QoS and a communication that implicitly requests the communication requiring application of the QoS.

The explicitly requesting communication is the one for reporting a communication characteristic required for data to be exchanged, to a communication partner prior to communication for actually transmitting or receiving the data. This communication enables to inquire about whether a desired communication characteristic can be realized or to request to control a node for realizing the desired communication characteristic.

For such communication, a signaling protocol such as a session initiation protocol (SIP) or a resource reservation protocol (RSVP) is commonly used. When the received packet is formed in such a specific protocol, the QoS terminal detector 113 determines that the packet belongs to the communication prior to the communication requiring application of the QoS.

In the communication by the signaling protocol, one communication may be constituted by a plurality of packets. For example, when the signaling protocol is the SIP, a communication sequence includes a request and a response thereto, and the communication sequence can be performed several times. In this case, the packet can be determined by one of two methods. A first method is for determining whether one packet matches the specific protocol and port number. A second method is for detecting all the packets by means of the packet processor 111 and the connection detector 112 to make determination by using the entire sequence. The QoS terminal detector 113 can detect the communication prior to the communication requiring application of the QoS by using either method.

The communication that implicitly requests the communication requiring application of the QoS does not use the signaling protocol such as the SIP or the RSVP. Instead, unique communication is performed to equipment that performs the communication requiring application of the QoS or desired communication. For example, IPTV equipment may be designed to access a specific server to obtain program information or information of a contents distribution network. In the first embodiment, such a communication is detected as the communication that implicitly requests the communication requiring application of the QoS.

The QoS terminal detector 113 specifies the communication that implicitly requests the communication requiring application of the QoS by using information such as the protocol, the IP address, the port number, and application data. However, because the set value of each of the information is different for each target equipment, the set value needs to be set beforehand in the storage unit 120 or the like. For example, the set value can be set by an administrator by using a user interface, or information downloaded from the network can be set.

The packet transfer apparatus 100 according to the first embodiment determines the node that has performed the communication satisfying any one of the two methods as the node requiring application of the QoS. When the communication prior to the communication requiring application of the QoS is detected, the communication requiring application of the QoS to be executed thereafter assumes that the node that explicitly or implicitly requests the communication requiring application of the QoS is an application target. This is general assumption; however, if the communication to a different node is requested, the node specified by the request is determined as the node requiring application of the QoS.

Details of the condition determining/notifying processing at Steps S608 and S614 are explained next with reference to FIG. 7.

Upon reception of the notification of the processing request from the connection detector 112 or the QoS terminal detector 113, the output unit 114 obtains the connection node list 122 and the QoS node list 123 from the storage unit 120 (Steps S701 and S702). The output unit 114 further obtains the topology condition list 121 from the storage unit 120 (Step S703).

The output unit 114 obtains an unprocessed condition from the obtained topology condition list 121 (Step S704). The output unit 114 determines whether the nodes included in the connection node list 122 and the nodes included in the QoS node list 123 satisfy the obtained condition (Step S705). Details of the determining process will be described later.

When the nodes satisfy the condition (YES at Step S705), the output unit 114 determines whether all the conditions in the topology condition list 121 have been processed (Step S706). When all the condition have not been processed (NO at Step S706), the output unit 114 obtains the next unprocessed condition to repeat the process (Step S704). When all the conditions have been processed (YES at Step S706), the condition determining/notifying process is finished.

When determining at Step S705 that the nodes included in the connection node list 122 and the nodes included in the QoS node list 123 do not satisfy the obtained condition (NO at Step S705), the output unit 114 sends output information indicating that the nodes do not satisfy the condition to the nodes connected to the LAN port 102 (Step S707), to finish the condition determining/notifying process.

The output unit 114 can send the output information only to the LAN port 102 which does not satisfy the condition, or to all the LAN ports 102. Further, the output unit 114 can send the output information by unicast to the node whose connection has been detected or to the node which is detected as the QoS node, or can send the output information by multicast to the nodes connected to the LAN port 102. Further, the output unit 114 can send the output information by unicast to a host connected to the wide area network 200 via the WAN port 101.

For example, when the node that does not satisfy the condition is equipment including no user interface, such as an IP phone, the user cannot recognize the output information even if the output information is sent by unicast. If the output information is sent by multicast, the information is also sent to a personal computer (PC) or the like that includes a user interface, and therefore the user can recognize the output information.

When the output information is to be sent by unicast, the output unit 114 determines a destination address by using the MAC address, the IPv4 address, or the IPv6 address included in the connection node list 122, the ARP table, or the neighboring node table.

On the other hand, when the output information is to be sent by multicast, the output unit 114 can define a new multicast address, or can use an existing multicast address. The output unit 114 can also use a universal plug and play (UPnP) widely used in a home network as an existing multicast notification method, for example. Further, the output unit 114 can send the notification for several times. In this case, for example, the output unit 114 is configured to send the notification again after predetermined time has passed since the notification.

The determining process at Step S705 is explained next in detail. As described above, the output unit 114 determines whether the node satisfies the condition in the topology condition list 121.

Specifically, the output unit 114 sequentially evaluates the conditions described in the topology condition list 121. For example, it is assumed here that the lists shown in FIGS. 3, 4, and 5 are obtained, respectively, as the topology condition list 121, the connection node list 122, and the QoS node list 123.

The output unit 114 first makes determination for a condition 301 of Number 1 in FIG. 3. That is, the output unit 114 confirms that the QoS communication node and the best-effort communication node are not connected together to the LAN port 102*a* with the port identifier 1. For example, the output unit 114 only needs to detect a node connected to the LAN port 102*a* with the port identifier 1 from the QoS node list 123 shown in FIG. 5, and confirm whether there is an entry including the same node as the detected node in the connection node list 122 shown in FIG. 4.

More specifically, the output unit 114 determines that the node with the MAC address of "AA:BB:CC:DD:EE:FF" is connected to the LAN port 102*a* with the port identifier 1, as the node that performs the QoS communication, with reference to FIG. 5. The output unit 114 can determine that only the node having the same MAC address is connected to the LAN port 102*a* with the port identifier 1, with reference to FIG. 4. Accordingly, the output unit 114 determines that condition 301 of number 1 is satisfied.

The output unit 114 subsequently determines whether a condition 302 of Number 2 is satisfied. Specifically, the output unit 114 confirms that the number of nodes connected to the LAN port 102*a* with the port identifier 1 is one. To do this, the output unit 114 needs only to confirm the connection node list 122. That is, the output unit 114 can confirm that only the node with the MAC address of "AA:BB:CC:DD:EE:FF" is connected to the LAN port 102*a* with the port identifier 1 from the connection node list 122 shown in FIG. 4. Accordingly, the output unit 114 determines that the condition 302 of Number 2 is also satisfied.

As a result of the determining process, in this example, the output unit 114 determines that the specified topology condition is satisfied. In this case, the output unit 114 does not perform special processing such as message notification, and maintains the current state.

Another specific example of the determining process at Step S705 is explained next. FIG. 8 is one example of the connection node list 122 used in this example. It is assumed here that the topology condition list 121 and the QoS node list 123 are the same as those shown in FIGS. 3 and 5.

Figures 7, 8:
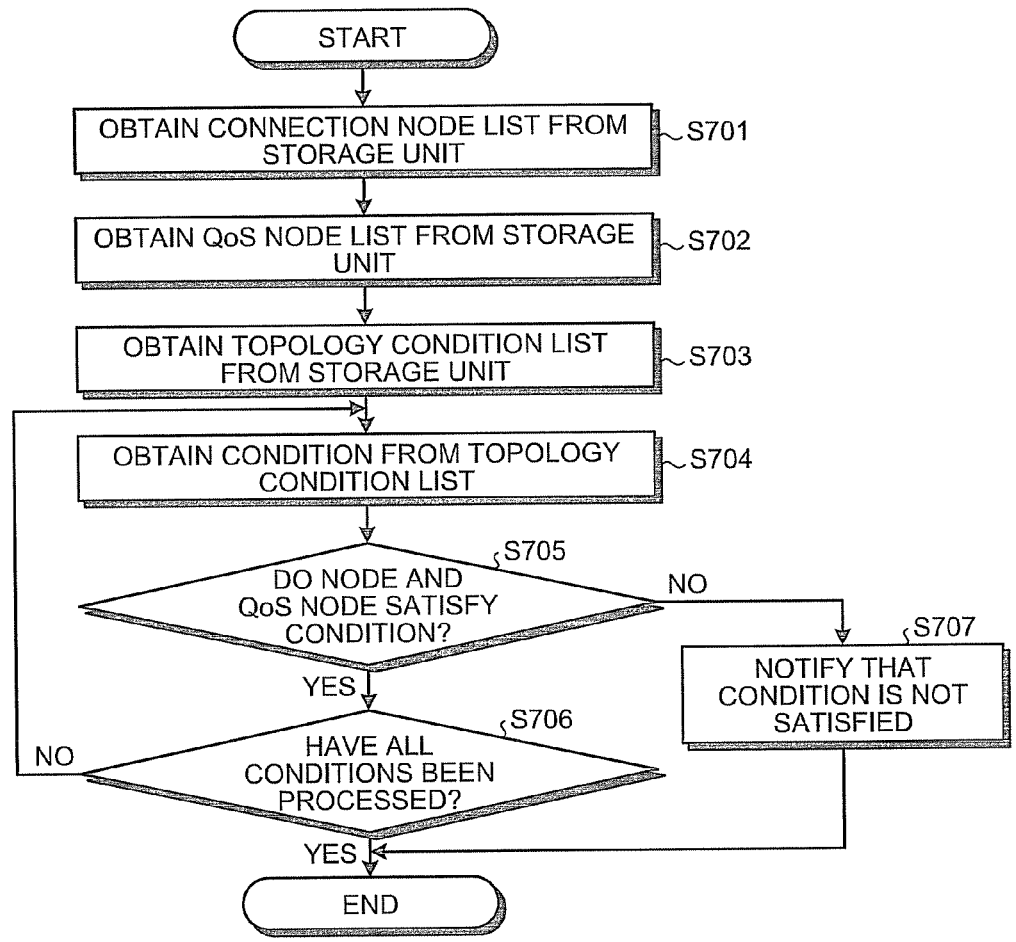
FIG. 7 is a flowchart of an overall flow of a condition determining/notifying process in the first embodiment.
FIG. 8 is a diagram illustrating one example of the connection node list.

It is also assumed that the connection node list 122 shown in FIG. 8 indicates a state in which connection of a new node with a MAC address of "19:28:37:46:55:00" is detected in the connection-node detecting process in the first half of FIG. 6.

As in the previous example, the output unit 114 sequentially performs evaluation from the condition 301 of Number 1 in the topology condition list 121. Specifically, the output unit 114 confirms the connection node list 122 and the QoS node list 123 to determine that a node that uses the communication requiring the QoS (MAC address "AA:BB:CC:DD:EE:FF") and a node that can use the best-effort communication (MAC address "19:28:37:46:55:00") are connected to the LAN port 102*a* with the port identifier 1. Accordingly, the output unit 114 determines that the condition 301 of Number 1 is not satisfied. The output unit 114 then notifies that the topology condition is not satisfied. The output unit 114 can include an unsatisfied condition or information of the node which is the cause of the unsatisfied condition (in this case, the node having the MAC address "19:28:37:46:55:00") in the notified message.

As described above, the example explained with reference to FIG. 8 indicates an example of the condition determining/notifying process (Step S608) executed in the connection-node detecting process in the first half of FIG. 6. That is, the determination whether the node, which is the cause of the unsatisfied condition, is the node requiring application of the QoS is not complete at the point in time when the determination of the output unit 114 is performed.

When it is found in the QoS-node detecting process executed thereafter that the node, which is the cause of the unsatisfied condition, requires application of the QoS, the condition 301 of Number 1 is satisfied.

Thus, the determination of the output unit 114 may be changed according to the communication state, even if the connection state of the node does not change. In the above example, because the condition 302 of Number 2 is not satisfied, final determination is unchanged.

To address such a situation, the output unit 114 can be configured to make determination again after a certain period of time has passed and a stable condition is achieved, and send a message. For example, the determination whether the topology condition is satisfied can be started when the user specifies network diagnosis from the user interface of the packet transfer apparatus 100.

The entry for the connection node list 122 stored in the storage unit 120 is deleted after preset effective time has passed. For example, in the case that the connection detector 112 detects the IPv4 ARP packet to thereby create the connection node list 122, the entry for the connection node list 122 is deleted when the effective period of the corresponding ARP entry has passed. In the case that the connection detector 112 uses the IPv6 Neighbor Discovery packet to create the entry for the connection node list 122, the entry for the connection node list 122 is deleted when the effective period of the corresponding entry in the neighboring node table has passed.

The entry for the QoS node list 123 stored in the storage unit 120 is deleted by a method corresponding to the detection method of the entry.

For example, in the case that the QoS terminal detector 113 detects communication that explicitly requests the communication requiring application of the QoS to thereby create an entry, the entry for the QoS node list 123 is deleted when the effective period included in the detected communication has passed, or when communication that explicitly invalidates or finishes the communication requiring application of the QoS is detected.

When the QoS terminal detector 113 detects communication that implicitly requests the communication requiring application of the QoS to thereby create an entry, the entry for the QoS node list 123 is also deleted when the entry for the connection node list 122 is deleted.

When the QoS terminal detector 113 detects the communication requiring application of the QoS to thereby create an entry, the entry for the QoS node list 123 is also deleted when the entry for the connection node list 122 is deleted.

The entry can be deleted by using a method other than the above methods. For example, a unique effective period is set to the entry for the QoS node list 123, and the entry can be deleted at timing when the effective period becomes invalid. In the first embodiment, the packet detected as the communication requiring application of the QoS or the communication prior to the communication requiring application of the QoS is only transferred by the packet transfer apparatus 100. An example of a packet transfer apparatus that processes these packets therein is shown as a modification.

In order for the packet processor 111 to process the packet, the address of the packet transfer apparatus 100 needs to be specified as a recipient address of the packet. Therefore, in the modification, the QoS terminal detector 113 detects only the communication that explicitly requests the communication requiring application of the QoS. For the communication that explicitly requests the communication requiring application of the QoS, the signaling protocol such as the SIP or the RSVP is generally used. In the modification, a case of using the SIP is explained as an example. That is, a case that the packet transfer apparatus 100 is operating as an SIP proxy is explained as an example.

In this case, an SIP message transmitted by a node connected to the LAN port 102 is processed by the packet transfer apparatus 100 operating as the SIP proxy. This processing is performed by the packet processor 111.

The packet processor 111 can detect a packet belonging to the communication prior to the communication requiring application of the QoS at a point in time when the packet is processed. Detected information is sent to the QoS terminal detector 113, and stored in the storage unit 120. A flow of the message transfer process is the same as shown in FIG. 6, and therefore explanations thereof will be omitted.

Thus, the packet transfer apparatus according to the first embodiment includes the function of detecting the node connected to each port of the packet transfer apparatus, and a function of detecting the communication applied with the QoS or the communication prior to the communication requiring application of the QoS. Therefore, the topology and the communication can be dynamically detected even in an environment in which the user can freely build the network such as the home network.

Because the function of determining whether the connection state of the node satisfies the predetermined condition is further included, the topology and the communication can be dynamically detected and it can be determined whether the topology can be applied with the required QoS, even in the environment in which the user can freely build the network such as the home network.

By including a function of sending a message indicating that it is found that the condition is not satisfied as a result of the determination, even a user having little network knowledge can understand and improve the problematic situation. That is, even the user having no network or computer expertise can be assisted in constructing the network topology to which the QoS can be correctly applied, for example.

A packet transfer apparatus according to a second embodiment of the present invention detects only connection of the node based on reception of a predetermined packet, to determine whether the detected node satisfies the connection condition, and when the connection condition is not satisfied, notifies the connected node of that effect.

As shown in FIG. 9, a packet transfer apparatus 900 includes the WAN port 101, the LAN ports 102a to 102c, a storage unit 920, the packet processor 111, the connection detector 112, and the output unit 114.

The second embodiment is different from the first embodiment in that the QoS terminal detector 113 is not included, the QoS node list 123 is deleted from the storage unit 920, and contents of a topology condition list 921 are different. Other components and functions are the same as those shown in FIG. 1, which is the block diagram of the configuration of the packet transfer apparatus 100 according to the first embodiment. Therefore, like numerals refer to like parts and explanations thereof will be omitted.

In the second embodiment, it is determined whether the QoS can be applied only based on the number of nodes whose connection has been detected. Therefore, although the connection detector 112 that detects the connected nodes is included, the QoS terminal detector 113 is deleted. Further, the QoS node list 123 that stores therein the entry created by the QoS terminal detector 113 is deleted.

The topology condition list 921 stores therein a condition defining only the number of connected nodes. For example, the condition is such that "only one node can be connected to the LAN port 102". Because the condition is fixed, the configuration can be such that the topology condition list 921 is not stored in the storage unit 920, and the output unit 114 uses the statically determined condition to execute the determining process.

In the second embodiment, the output unit 114 confirms the number of nodes connected to the LAN port 102, and determines whether the number exceeds a threshold value set in the condition in the topology condition list 921. When nodes in a number larger than the threshold value are connected thereto, the output unit 114 sends a message indicating that the condition is not satisfied.

The message transfer process in the second embodiment corresponds to the process shown in FIG. 6, which depicts the message transfer process in the first embodiment, from which the latter half thereof (Steps S609 to S614) is deleted, and therefore explanations thereof will be omitted.

The packet transfer apparatus according to the second embodiment can determine whether the number of connected nodes detected based on reception of the predetermined packet satisfies the connection condition, and when the condition is not satisfied, notify the connected nodes of that effect. Accordingly, construction of the network topology to which the QoS can be correctly applied can be assisted.

A packet transfer apparatus according to a third embodiment of the present invention detects only the QoS node based on reception of the predetermined packet, to determine whether the detected QoS node satisfies the connection condition, and when the connection condition is not satisfied, notifies the connected QoS node of that effect.

As shown in FIG. 10, a packet transfer apparatus 1000 includes the WAN port 101, the LAN ports 102a to 102c, a storage unit 1020, the packet processor 111, the QoS terminal detector 113, and the output unit 114.

The third embodiment is different from the first embodiment in that the connection detector 112 is not included, the connection node list 122 is deleted from the storage unit 1020, and contents of a topology condition list 1021 are different. Other components and functions are the same as those shown in FIG. 1, which is the block diagram of the configuration of the packet transfer apparatus 100 according to the first embodiment. Therefore, like numerals refer to like parts and explanations thereof will be omitted.

In the third embodiment, a situation in which all bands are occupied by the QoS communication is assumed. Therefore, only the information of the QoS communication is handled. That is, in the third embodiment, determination of whether the QoS can be applied is performed only by detecting the QoS node. Therefore, although the QoS terminal detector 113 that detects the QoS nodes is included, the connection detector 112 is deleted. Further, the connection node list 122 that stores therein the entry created by the connection detector 112 is deleted.

The topology condition list 1021 stores therein only a condition associated with the node performing the QoS communication. For example, the condition is such that "up to two nodes performing the QoS communication can be connected to each port".

In the third embodiment, the output unit 114 confirms whether the node performing the QoS communication, which is detected by the QoS terminal detector 113, satisfies the condition in the topology condition list 1021.

The message transfer process in the third embodiment corresponds to the process shown in FIG. 6, which depicts the message transfer process in the first embodiment, from which the first half thereof (Steps S603 to S608) is deleted, and therefore explanations thereof will be omitted.

Thus, the packet transfer apparatus according to the third embodiment can determine whether the QoS node detected based on reception of the predetermined packet satisfies the connection condition, and when the condition is not satisfied, notify the connected QoS node of that effect. Accordingly, the user can be assisted in constructing the network topology to which the QoS can be correctly applied.

In the first to third embodiments, the detection of the node and the detection of the node requesting application of the QoS communication are separately executed. In a fourth embodiment of the present invention, these detections are combined to perform the detection process more efficiently. Therefore, a packet transfer apparatus according to the fourth embodiment stores information of the QoS node in a nonvolatile memory, and determines whether the connected node is the QoS node at the same time with the detection of the node, by referring to the stored information.

Figure 11:
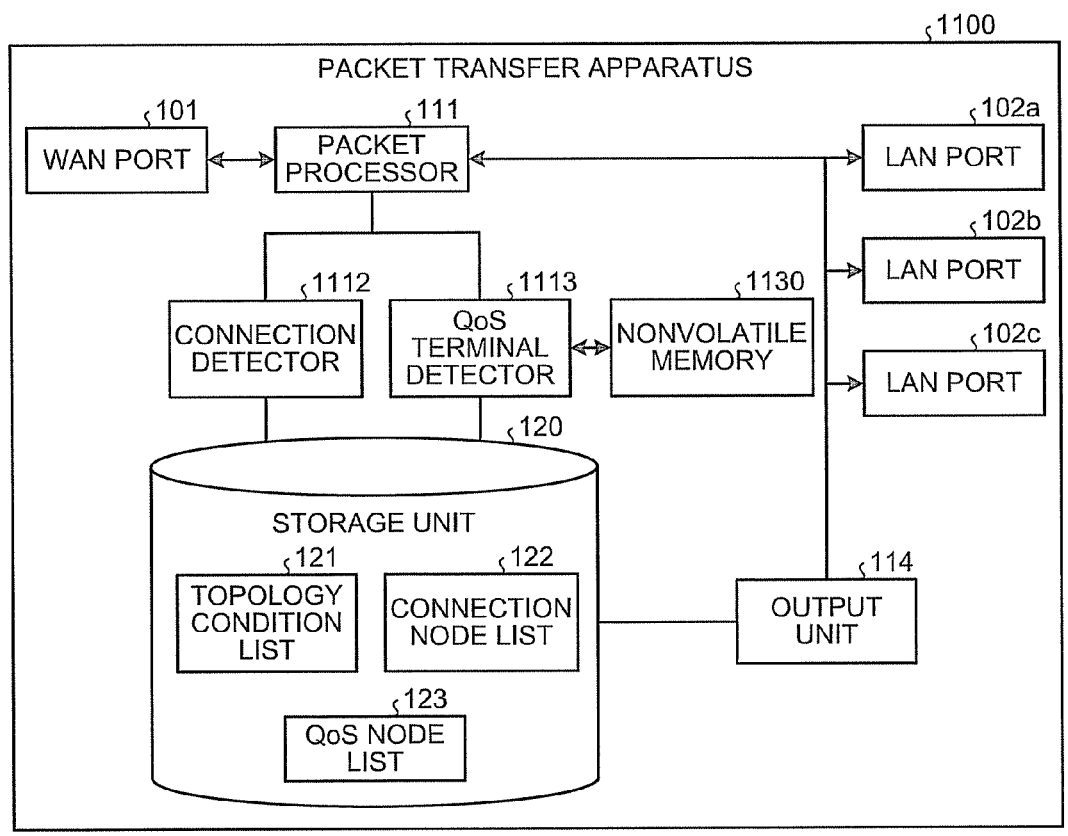
FIG. 11 is a block diagram of a packet transfer apparatus according to a fourth embodiment of the present invention.

As shown in FIG. 11, a packet transfer apparatus 1100 includes the WAN port 101, the LAN ports 102a to 102c, the storage unit 120, the packet processor 111, a connection detector 1112, a QoS terminal detector 1113, the output unit 114, and a nonvolatile memory 1130.

The fourth embodiment is different from the first embodiment in addition of the nonvolatile memory 1130 and the functions of the connection detector 1112 and the QoS terminal detector 1113. Other components and functions are the same as those shown in FIG. 1, which is the block diagram of the configuration of the packet transfer apparatus 100 according to the first embodiment. Therefore, like numerals refer to like parts, and explanations thereof will be omitted.

The nonvolatile memory 1130 is a storage medium in which information is not erased even if power to the packet transfer apparatus 1100 is cut, such as a flash memory. The nonvolatile memory 1130 stores therein information capable of specifying the QoS node. Specifically, the nonvolatile memory 1130 stores therein information the same as that in the QoS node list 123 shown in FIG. 5 (hereinafter, "long-term QoS node list").

The connection detector 1112 is different from the connection detector 112 in the first embodiment in that the connection detector 1112 additionally has a function of notifying the QoS terminal detector 1113 of the node identifier of the connected node and the port identifier of the LAN port 102 connected with the detected node, when connection of the node is detected.

The QoS terminal detector 1113 additionally has a function of storing the QoS node list 123 in the storage unit 120 and the long-term QoS node list in the nonvolatile memory 1130, when the QoS node is detected. The QoS terminal detector 1113 is further added with a function of using the node identifier and the port identifier notified by the connection detector 1112 to execute detection of the QoS node even at the time of detecting the node, and executing the request of the condition determining/notifying process.

Figure 12:
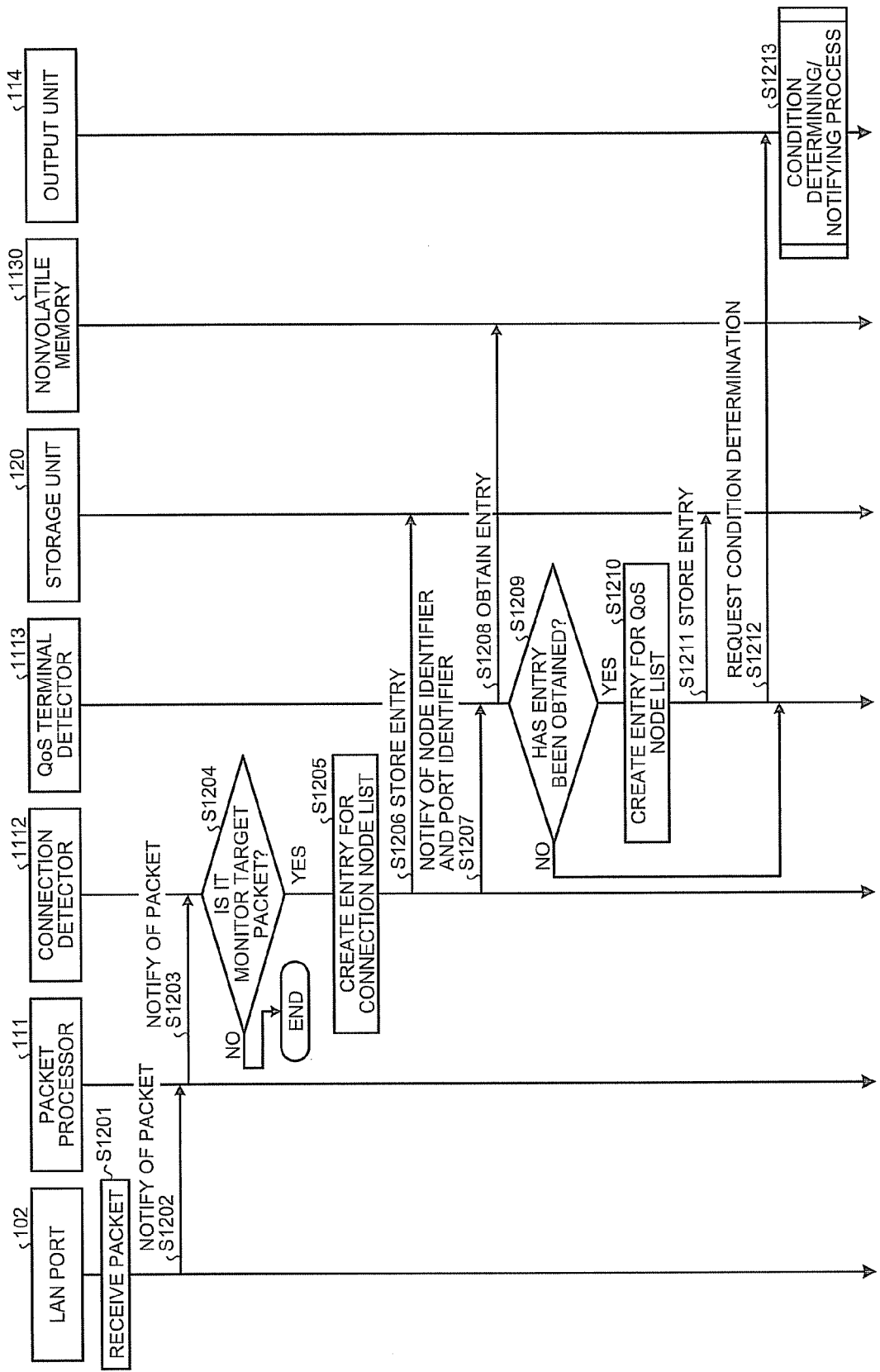
FIG. 12 is a sequence diagram of an overall flow of a message transfer process in the fourth embodiment.
Figure 13:
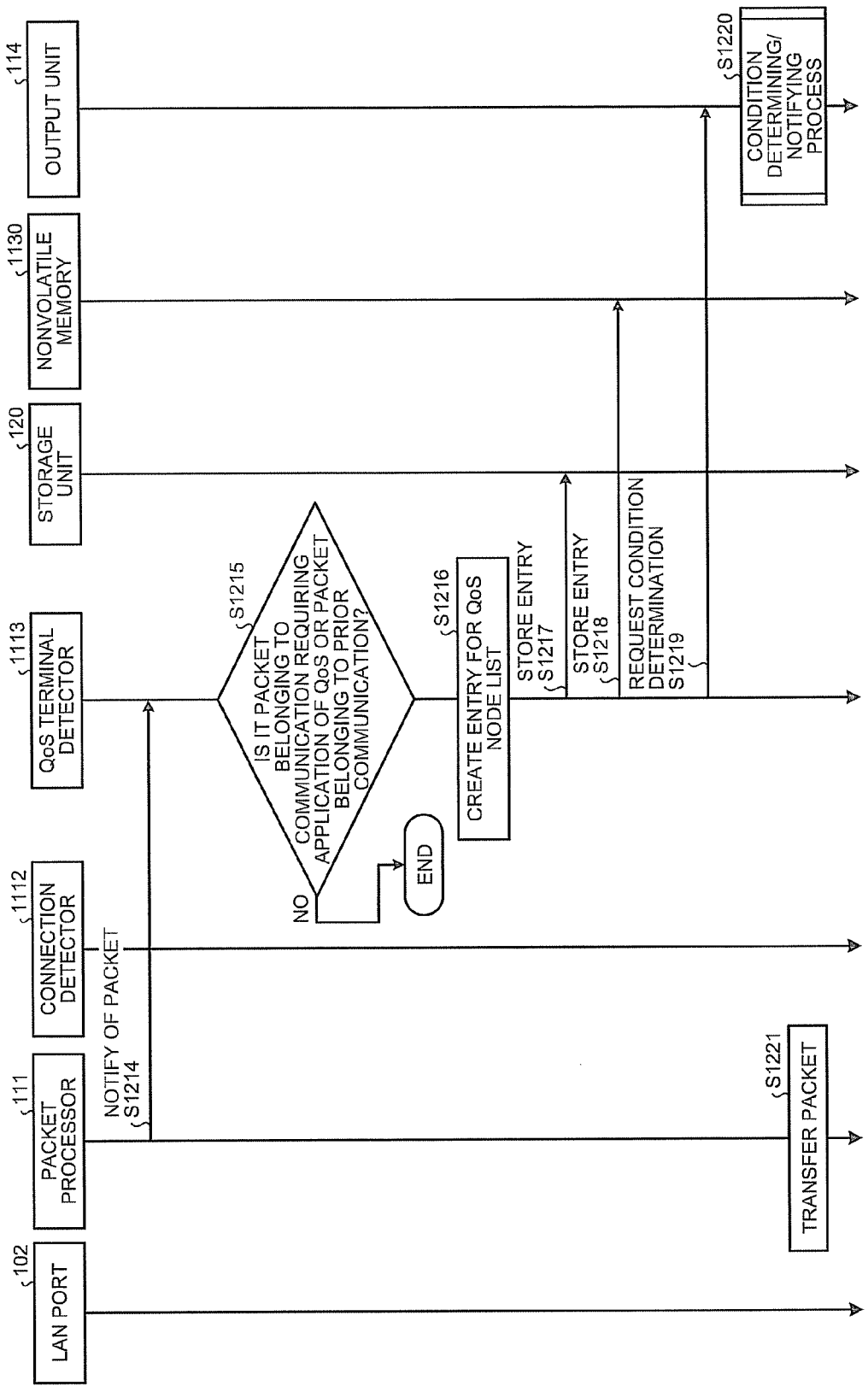
FIG. 13 is a sequence diagram of another overall flow of the message transfer process in the fourth embodiment.

The message transfer process performed by the packet transfer apparatus 1100 according to the fourth embodiment having the above configuration is explained next with reference to FIGS. 12 and 13.

A packet receiving process, a determining process for the monitor target packet, and an entry storing process from Steps S1201 to S1206 are the same as those from Steps S601 to S606 performed by the packet transfer apparatus 100 according to the first embodiment, and therefore explanations thereof will be omitted.

After storing the entry in the connection node list 122, the connection detector 1112 notifies the QoS terminal detector 1113 of the node identifier of the detected node and the port identifier of the LAN port 102 connected with the detected node (Step S1207).

The QoS terminal detector 1113 then obtains an entry including the notified node identifier and port identifier from the long-term QoS node list stored in the nonvolatile memory 1130 (Step S1208).

The QoS terminal detector 1113 then determines whether the entry including the notified node identifier and port identifier has been successively obtained (Step S1209). When the entry has been obtained (YES at Step S1209), the QoS terminal detector 1113 creates an entry to be stored in the QoS node list 123 in the storage unit 120 (Step S1210). Specifically, the QoS terminal detector 1113 creates the same entry as that obtained from the nonvolatile memory 1130.

The entry storing process and the condition determining/notifying process from Steps S1211 to S1213 are the same as those from Steps S612 to S614 performed by the packet transfer apparatus 100 according to the first embodiment, and therefore explanations thereof will be omitted.

By performing these processes, when it is stored in the nonvolatile memory 1130 that the node is the QoS node, it can be determined that the detected node is the QoS node when connection of the node is detected. That is, the process for detecting the QoS node by determining the packet for the communication requiring application of the QoS (QoS-node detecting process) needs not be executed.

When the node is first connected to the packet transfer apparatus 1100, the corresponding entry is not stored in the nonvolatile memory 1130. Therefore, determination whether the node is the QoS node needs to be performed by referring to a packet transmitted by the node thereafter.

That is, when the entry including the notified node identifier and port identifier cannot be obtained at Step S1209 (NO at Step S1209), the QoS terminal detector 1113 executes the process for detecting the communication requiring application of the QoS or the communication prior to the communication requiring application of the QoS (Steps S1214 to S1220).

A packet determining process, an entry creating process, and the entry storing process from Steps S1214 to S1217 are the same as those from Steps S609 to S612 performed by the packet transfer apparatus 100 according to the first embodiment, and therefore explanations thereof will be omitted.

In the fourth embodiment, the QoS terminal detector 1113 stores the entry created at the time of detecting the QoS node also in the nonvolatile memory 1130 (Step S1218).

A request process and the condition determining/notifying process at Steps S1219 and S1220 are the same as those at Steps S613 and S614 performed by the packet transfer apparatus 100 according to the first embodiment, and therefore explanations thereof will be omitted. Because the packet transfer process at Step S1221 is the same as that at Step S615 performed by the packet transfer apparatus 100 according to the first embodiment, explanations thereof will be omitted.

Thus, the packet transfer apparatus according to the fourth embodiment stores the information of the QoS node in the nonvolatile memory, and by referring to the stored information, can determine whether the connected node is the QoS node at the same time with detection of the node. Accordingly, the QoS-node detecting process can be performed more efficiently.

In the first to fourth embodiments, connection of the node is detected by receiving the specific packet. A packet transfer apparatus according to a fifth embodiment of the present invention detects connection of equipment such as the node or a switching hub by an electric signal detected when the equipment is connected to the LAN port. When a difference between detection time of the electric signal and reception time of the predetermined packet is equal to or larger than a threshold value, it is determined that the node does not satisfy the connection condition.

Figure 14:
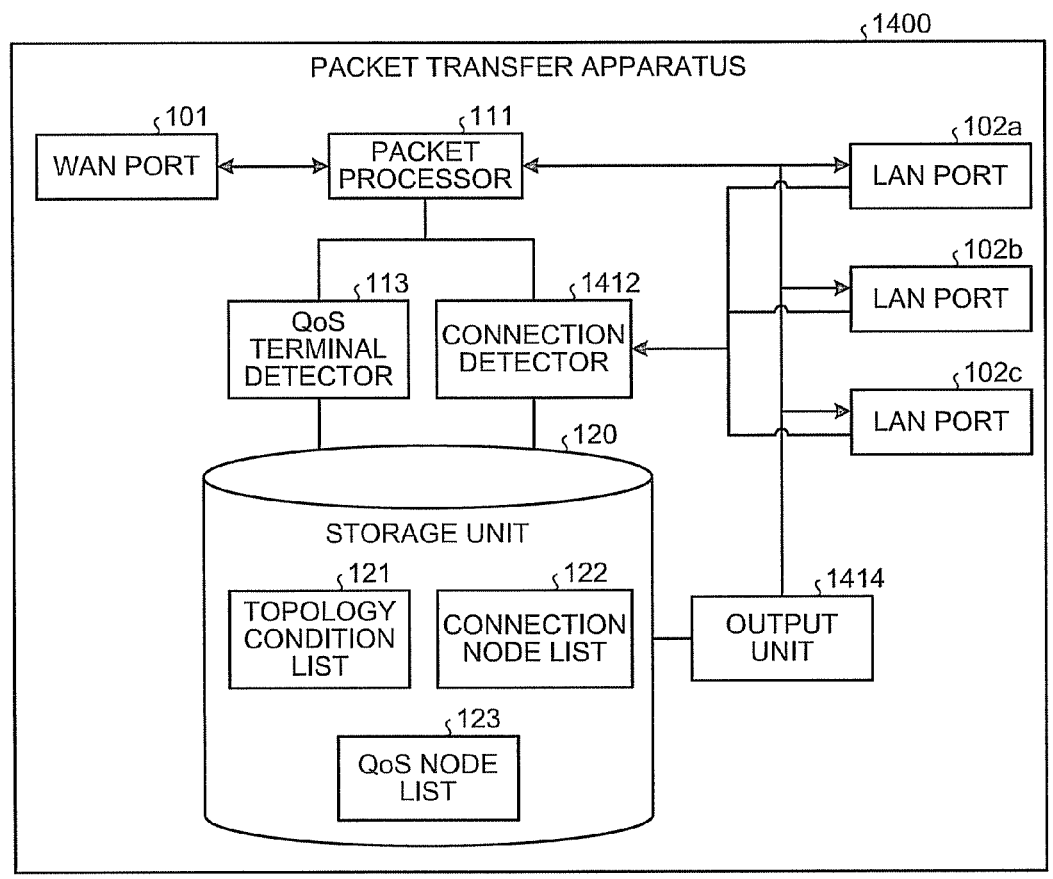
FIG. 14 is a block diagram of a packet transfer apparatus according to a fifth embodiment of the present invention.

As shown in FIG. 14, a packet transfer apparatus 1400 includes the WAN port 101, the LAN ports 102a to 102c, the storage unit 120, the packet processor 111, a connection detector 1412, the QoS terminal detector 113, and an output unit 1414.

The fifth embodiment is different from the first embodiment in functions of the connection detector 1412 and the output unit 1414. Other components and functions are the same as those shown in FIG. 1, which is the block diagram of the configuration of the packet transfer apparatus 100 according to the first embodiment. Therefore, like numerals refer to like parts and explanations thereof will be omitted here.

The connection detector 1412 is different from the connection detector 112 in the first embodiment in that a function of monitoring the electric signal indicating a link state of the LAN port 102, and a function of calculating a period from detection time (date and time) of link-up of each LAN port 102 to detection time (date and time) of a monitor target packet (difference between monitored-packet detection time and link-up detection time) are additionally included. As shown in FIG. 14, the connection detector 1412 is directly connected to each LAN port 102 for detecting the electric signal.

The output unit 1414 is different from the output unit 114 in the first embodiment in that a function of determining that the network topology is improper when the difference between the link-up time and the monitored-packet detection time is equal to or larger than the preset threshold value is added. In the fifth embodiment, it is assumed that "only one node can be connected to one QoS LAN port" or a similar condition is stored in the topology condition list 121. The QoS LAN port means a port for connecting a node for the QoS communication.

An example of the network topology, which is determined to be normal or improper by the output unit 1414, is explained with reference to FIGS. 15 and 16.

Figure 15:
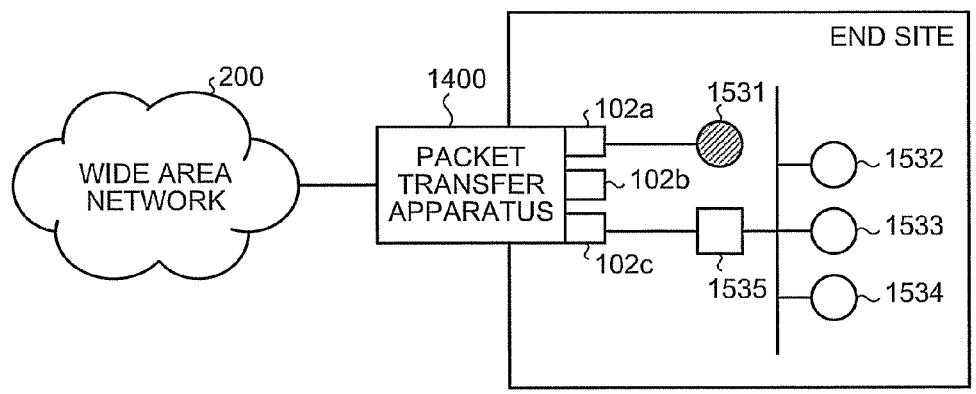
FIG. 15 is a diagram illustrating one example of topology determined to be normal.

It is assumed that the LAN port 102a in FIG. 15 is the QoS LAN port. In FIG. 15, a node 1531 performing the QoS communication is directly connected to the LAN port 102a. Three nodes 1532 to 1534 performing the best-effort communication are connected to the LAN port 102c via a switching hub 1535.

In FIG. 15, only one node performing the QoS communication is connected to the QoS LAN port. Therefore, the output unit 1414 determines that the condition in the topology condition list 121 is satisfied.

Figure 16:
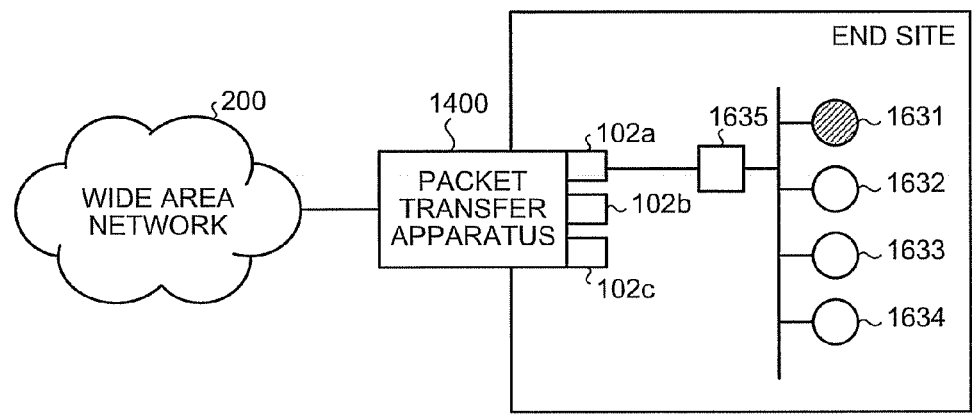
FIG. 16 is a diagram illustrating one example of topology determined to be improper.

It is assumed here that the LAN port 102a in FIG. 16 is the QoS LAN port. In FIG. 16, a switching hub 1635 is connected to the QoS LAN port, and downstream of the switching hub 1635, a node 1631 performing the QoS communication and nodes 1632 to 1634 performing the best-effort communication are connected together. Therefore, the output unit 1414 determines that the condition in the topology condition list 121 is not satisfied because many nodes are connected to the QoS LAN port.

As described above, the output unit 1414 can determine that the topology in FIG. 15 is normal and the topology in FIG. 16 is improper by comparing the difference between the link-up time of the LAN port 102 and the monitored-packet detection time with the predetermined threshold value.

For example, in the case of FIG. 15, it is expected that the link-up time of the LAN port 102 and the reception time of the monitor target packet from the node 1532 connected to the LAN port 102 do not change largely, with a small time difference between startup of the node and initialization of a protocol stack.

On the other hand, in the case of FIG. 16, if it is assumed that the switching hub 1635 is always powered on, it is considered that the LAN port 102 is linked up considerably before reception of the monitor target packet from the nodes 1631 to 1634.

Therefore, the output unit 1414 according to the fifth embodiment sets an appropriate threshold value capable of discriminating the topology based on the difference above mentioned, and determines whether the difference between the link-up time and the detection time of the monitor target packet is smaller than the threshold value, to thereby determine whether the topology is proper.

Figure 17:
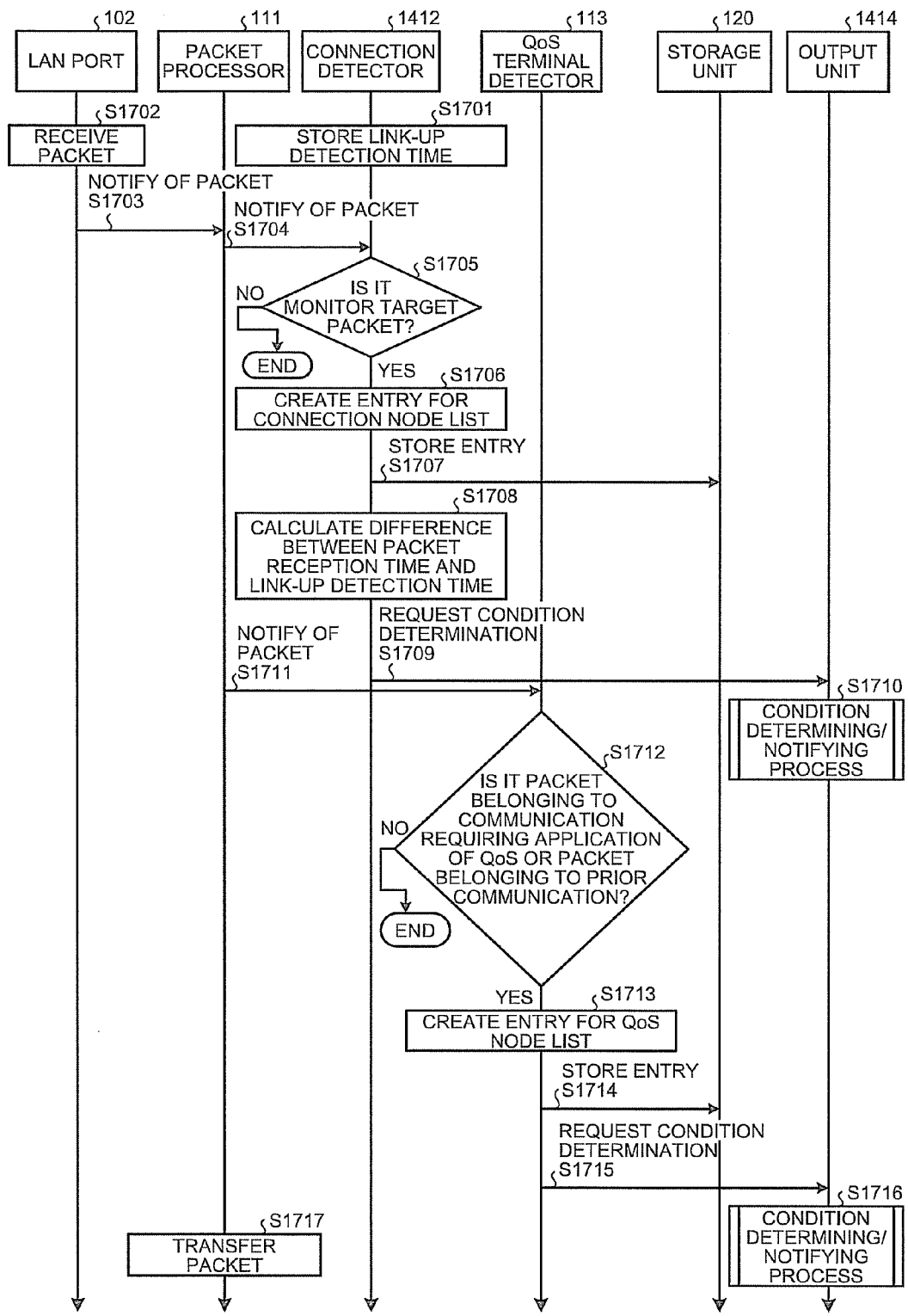
FIG. 17 is a sequence diagram of an overall flow of a message transfer process in the fifth embodiment.

The message transfer process performed by the packet transfer apparatus 1400 according to the fifth embodiment having the above configuration is explained with reference to FIG. 17.

The connection detector 1412 first detects link up of the equipment with respect to each LAN port 102, and stores therein the detected time (Step S1701).

The packet receiving process, the determining process for the monitor target packet, and the entry storing process from Steps S1702 to S1707 are the same as those from Steps S601 to S606 performed by the packet transfer apparatus 100 according to the first embodiment, and therefore explanation thereof will be omitted.

The connection detector 1412 then calculates a difference between the reception time of the monitor target packet and the link-up detection time (Step S1708). The connection detector 1412 then requests the output unit 1414 to perform condition determination (Step S1709). At this time, the connection detector 1412 notifies the output unit 1414 of the calculated difference. The output unit 1414 executes the condition determining/notifying process by referring to the notified difference and the like (Step S1710). Details of the condition determining/notifying process in the fifth embodiment will be described later.

A packet notifying process, the entry storing process, the condition determining/notifying process, and the packet transfer process from Steps S1711 to S1717 are the same as those from Steps S609 to S615 performed by the packet transfer apparatus 100 according to the first embodiment, and therefore explanations thereof will be omitted.

Figure 18:
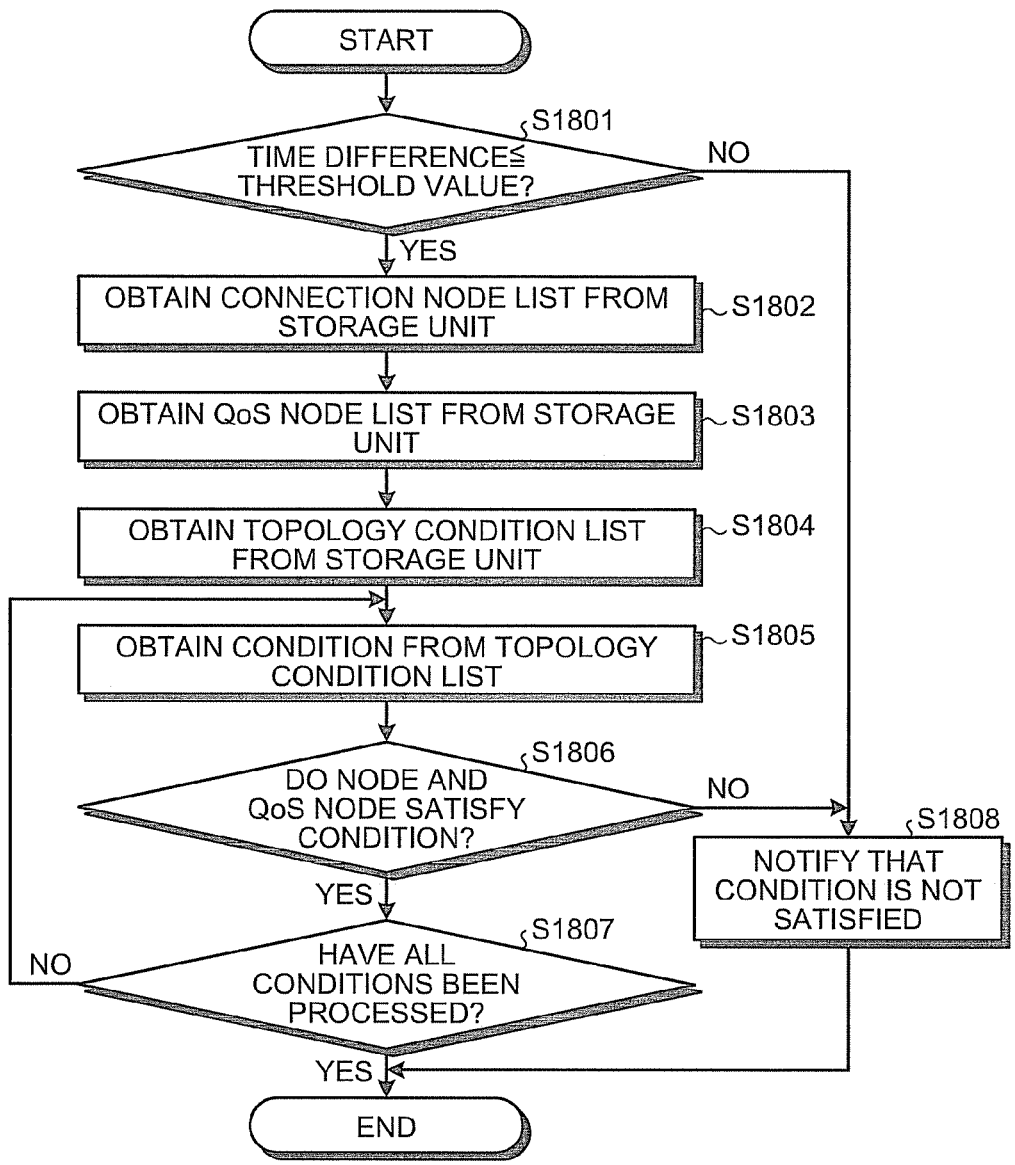
FIG. 18 is a flowchart of an overall flow of a condition determining/notifying process in the fifth embodiment.

The details of the condition determining/notifying process at Steps S1710 and S1716 are explained with reference to FIG. 18.

The output unit 1414 determines whether the time difference notified from the connection detector 1412 is equal to or less than the preset threshold value (Step S1801). When the difference is not equal to or less than the threshold value (NO at Step S1801), the output unit 1414 sends output information indicating that the condition is not satisfied to the connection detector 1412 (Step S1808), to finish the condition determining/notifying process.

When the difference is equal to or less than the threshold value (YES at Step S1801), the output unit 1414 executes the same processes as those from Step S701 performed by the packet transfer apparatus 100 according to the first embodiment.

Thus, the packet transfer apparatus according to the fifth embodiment detects connection of the equipment to the LAN port based on the electric signal detected at the time of the connection of the equipment. When the difference between the detection time of the electric signal and the reception time of the predetermined packet is equal to or larger than the threshold value, it can be determined that the node does not satisfy the connection condition.

Figure 19:
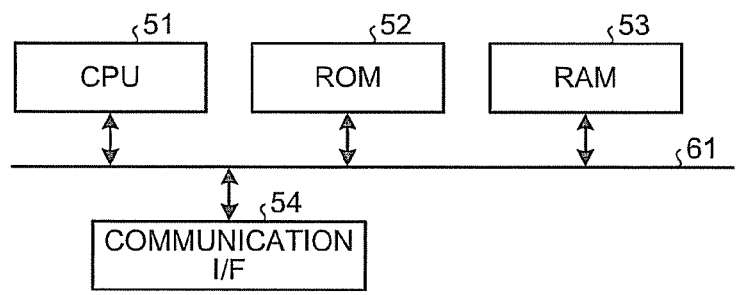
FIG. 19 is a schematic diagram for explaining a hardware configuration of the packet transfer apparatus according to one of the first to fifth embodiments.

Hardware configurations of the packet transfer apparatus according to the first to fifth embodiments are explained with reference to FIG. 19.

The packet transfer apparatus according to the first to fifth embodiments includes a controller such as a central processing unit (CPU) 51, memories such as a read only memory (ROM) 52 and a RAM 53, a communication I/F 54 for connecting to a network to perform communication, and a bus 61 for connecting these units.

An output program executed by the packet transfer apparatus according to the first to fifth embodiments is incorporated beforehand in the ROM 52 or the like.

The output program executed by the packet transfer apparatus according to the first to fifth embodiments can be recorded on a computer-readable recording medium such as a compact disk read only memory (CD-ROM), a flexible disk (FD), a CD recordable (CD-R), or a digital versatile disk (DVD) in a file of an installable or executable format, and provided.

The output program executed by the packet transfer apparatus according to the first to fifth embodiments has a module configuration including the units described above (the packet processor, the connection detector, the QoS terminal detector, and the output unit). As practical hardware, the CPU 51 reads the output program from the RON 52 and executes the output program, to load the units into a main memory, so that the units are generated in the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A message transfer apparatus comprising:
a first port to be connected to a first network to which a communication terminal is connected;
a second port to be connected to a second network;
a message processor that transfers a message received by the first port to the second port, and transfers a message received by the second port to the first port;
a Quality of Service (QoS) terminal detector that determines whether first specific information capable of specifying a message type is included in the received message, and when the first specific information is included therein, detects the communication terminal, the communication terminal being a sender of the message received by the first port or a destination of the message received by the second port, as a QoS terminal requesting application of QoS;
a storage unit that stores a connection condition that indicates a condition of a connection form to the first port of the QoS terminal and the communication terminal that is not requesting application of a QoS; and
an output controller that determines whether the QoS terminal satisfies the connection condition, and when the QoS terminal does not satisfy the connection condition, controls output of output information indicating that the connection condition is not satisfied.

2. The apparatus according to claim 1, further comprising:
a connection detector that determines whether preset second specific information capable of specifying a message type is included in the message received by the first port, and when the second specific information is included therein, detects the communication terminal, the communication terminal being the sender of the message received by the first port, as the connection terminal connected to the first port via the first network, wherein
the output controller further determines whether the communication terminal determined to be connected satisfies the connection condition, and when the communication terminal does not satisfy the connection condition, outputs the output information.

3. The apparatus according to claim 1, wherein
the first specific information is specific protocol information indicating that the message is transmitted in a preset specific protocol, and
the QoS terminal detector determines whether the specific protocol information is included in header information of the received message, and when the specific protocol information is included therein, detects the communication terminal, which is the sender of the message received by the first port or the destination of the message received by the second port, as the QoS terminal.

4. The apparatus according to claim 1, wherein
the first specific information is a preset specific IP address, and
the QoS terminal detector determines whether the specific IP address is included in a destination IP address of the message received by the first port or in a sender IP address of the message received by the second port, and when the specific IP address is included therein, detects the communication terminal, which is the sender of the message received by the first port or the destination of the message received by the second port, as the QoS terminal.

5. The apparatus according to claim 1, wherein
the first specific information is a preset specific port number, and
the QoS terminal detector determines whether the specific port number is included in a destination port number of the message received by the first port or a sender port number of the message received by the second port, and when the specific port number is included therein, detects the communication terminal, which is the sender of the message received by the first port or the destination of the message received by the second port, as the QoS terminal.

6. The apparatus according to claim 1, wherein
the first specific information is a specific value indicating a specific one of set values settable to a predetermined set item in header information of the message, and
the QoS terminal detector determines whether the specific value is included as the set value of the set item in the header information of the received message, and when the specific value is included therein, detects the communication terminal, which is the sender of the message received by the first port or the destination of the message received by the second port, as the QoS terminal.

7. The apparatus according to claim 1, wherein
the first specific information is a preset specific character string capable of specifying a data format of data to be transmitted via a massage, and
the QoS terminal detector determines whether the specific character string is included in the message, and when the specific character string is included therein, detects the communication terminal, which is the sender of the message received by the first port or the destination of the message received by the second port, as the QoS terminal.

8. A message transfer apparatus comprising:
a first port to be connected to a first network to which a communication terminal is connected;
a second port to be connected to a second network;
a message processor that transfers a message received by the first port to the second port, and transfers a message received by the second port to the first port;
a Quality of Service (QoS) terminal detector that determines whether first specific information capable of specifying a message type is included in the received message, and when the first specific information is included therein, detects the communication terminal, the communication terminal being a sender of the message received by the first port or a destination of the message received by the second port, as a QoS terminal requesting application of QoS;
a storage unit that stores a connection condition indicates indicating that the number of QoS terminals connectable to the first port is equal to or less than a preset threshold value; and
an output controller that determines whether the number of the QoS terminals connected to the first port is equal to or less than the threshold value, and controls output of outputs the output information indicating that the connection condition is not satisfied when the number of the QoS terminals is not equal to or less than the threshold value.

9. The apparatus according to claim 1, wherein
the connection condition indicates that the communication terminal which does not request application of the QoS and the QoS terminal are not connected together to the first port, and
the output controller determines whether the communication terminal which does not request application of the QoS and the QoS terminal are connected together to the first port, and outputs the output information when these terminals are connected together to the first port.

10. The apparatus according to claim 1, wherein the output controller transmits the output information, which is a message indicating that the connection condition is not satisfied, to the first network, when the detected QoS terminal does not satisfy the connection condition.

11. The apparatus according to claim 1, further comprising:
a display unit capable of displaying the output information, wherein
the output controller displays the output information on the display unit when the detected QoS terminal does not satisfy the connection condition.

12. An output method comprising:
transferring a massage received by a first port to be connected to a first network to which a communication terminal is connected, to a second port to be connected to a second network, and transferring a massage received by the second port to the first port;
determining whether first specific information capable of specifying a message type is included in the received message;
detecting the communication terminal, which is a sender of the message received by the first port or a destination of the message received by the second port, as a QoS terminal requesting application of QoS, when the first specific information is included therein;
determining whether the QoS terminal satisfies a connection condition that indicates a condition of a connection form to the first port of the QoS terminal and the communication terminal that is not requesting application of the QoS; and
outputting output information indicating that the connection condition is not satisfied when the QoS terminal does not satisfy the connection condition.

13. A computer program product having a non-transitory computer readable medium including programmed instructions for outputting information, wherein the instructions, when executed by a computer, cause the computer to perform:
transferring a massage received by a first port to be connected to a first network to which a communication terminal is connected, to a second port to be connected to a second network, and transferring a massage received by the second port to the first port;
determining whether first specific information capable of specifying a message type is included in the received message;
detecting the communication terminal, which is a sender of the message received by the first port or a destination of the message received by the second port, as a QoS terminal requesting application of QoS, when the first specific information is included therein;
determining whether the QoS terminal satisfies a preset connection condition that indicates a condition of a connection form to the first port of the QoS terminal and the communication terminal that is not requesting application of the QoS; and
outputting output information indicating that the connection condition is not satisfied when the QoS terminal does not satisfy the connection condition.

14. A message transfer apparatus comprising:
a first port to be connected to a first network to which a communication terminal is connected;
a second port to be connected to a second network;
a message processor that transfers a message received by the first port to the second port, and transfers a message received by the second port to the first port;
a connection detector that determines whether first specific information capable of specifying a message type is included in the message received by the first port, and when the first specific information is included therein, detecting detects the communication terminal, the communication terminal being a sender of the message received by the first port, as a communication terminal connected to the first port via the first network;
a storage unit that stores a connection condition that indicates a condition of a network topology for the first network for applying service to the communication terminal connectable to the first port via the first network; and
an output controller that determines whether the communication terminal determined to be connected satisfies the connection condition, and when the communication terminal does not satisfy the connection condition, controls output of output information indicating that the connection condition is not satisfied, wherein
the storage unit further stores terminal identification information for identifying a QoS terminal, the QoS terminal being the communication terminal requesting application of QoS,
the connection condition includes a condition for applying the QoS to the QoS terminal connectable to the first port, and the output controller further determines whether the terminal identification information for identifying the communication terminal determined to be connected is stored in the storage unit and further determines, when the terminal identification information is stored therein, whether the communication terminal determined to be connected satisfies the condition included in the connection condition; and the output controller outputs, when the communication terminal does not satisfy the connection condition, the output information indicating that the connection condition is not satisfied.

15. The apparatus according to claim 14, wherein
the specific information is specific protocol information indicating that the message is transmitted in a preset specific protocol, and
the connection detector determines whether the specific protocol information is included in header information of the received message, and when the specific protocol information is included therein, detects the communication terminal, which is the sender of the message received by the first port, as the communication terminal connected to the first port via the first network.

16. The apparatus according to claim 14, wherein
the connection condition indicates that the number of communication terminals connectable to the first port is equal to or less than a preset first threshold value, and
the output controller determines whether the number of communication terminals connected to the first port is equal to or less than the first threshold value, and outputs the output information when the number of communication terminals is not equal to or less than the first threshold value.

17. The apparatus according to claim 14, wherein
the connection detector further obtains detection date and time of an electric signal output when a communication device including the communication terminal is connected to the first port,
the connection condition indicates that a period from the detection date and time of the electric signal to reception date and time of a message including the specific information is equal to or less than a preset second threshold value, and
the output controller calculates the period from the detection date and time of the electric signal to the reception date and time of the message including the specific information to determine whether the calculated period is equal to or less than the second threshold value, and outputs the output information when the calculated period is not equal to or less than the second threshold value.

18. The apparatus according to claim 14, wherein the output controller transmits the output information, which is a message indicating that the connection condition is not satisfied, to the first network, when the communication terminal does not satisfy the connection condition.

19. The apparatus according to claim 14, further comprising:
a display capable of displaying the output information, wherein
the output controller displays the output information on the display unit when the communication terminal does not satisfy the connection condition.

20. An output method comprising:
transferring a massage received by a first port to be connected to a first network to which a communication terminal is connected, to a second port to be connected to a second network, and transferring a massage received by the second port to the first port;
determining whether preset specific information capable of specifying a message type is included in the message received by the first port;
detecting the communication terminal, which is a sender of the message received by the first port, as a communication terminal connected to the first port via the first network when the specific information is included therein;
determining whether the communication terminal determined to be connected satisfies a preset connection condition that indicates a condition of a network topology for the first network for applying service to the communication terminal connectable to the first port via the first network; and
outputting output information indicating that the connection condition is not satisfied when the communication terminal does not satisfy the connection condition, wherein
the output method further comprises:
determining whether the terminal identification information for identifying the communication terminal determined to be connected is stored in a storage unit, the storage unit storing terminal identification information for identifying a QoS terminal, the QoS terminal being the communication terminal requesting application of QoS;
determining, when the terminal identification information is stored in the storage unit, whether the communication terminal determined to be connected satisfies the condition included in the connection condition; and
outputting, when the communication terminal does not satisfy the connection condition, the output information indicating that the connection condition is not satisfied.

21. A computer program product having a non-transitory computer readable medium including programmed instructions for outputting information, wherein the instructions, when executed by a computer, cause the computer to perform:
transferring a massage received by a first port to be connected to a first network to which a communication terminal is connected, to a second port to be connected to a second network, and transferring a massage received by the second port to the first port;
determining whether preset specific information capable of specifying a message type is included in the message received by the first port;
detecting the communication terminal, which is a sender of the message received by the first port, as a communication terminal connected to the first port via the first network when the specific information is included therein;
determining whether the communication terminal determined to be connected satisfies a preset connection condition that indicates a condition of a network topology for the first network for applying service to the communication terminal connectable to the first port via the first network; and
outputting output information indicating that the connection condition is not satisfied when the communication terminal does not satisfy the connection condition, wherein
the instructions further cause the computer to perform:
determining whether the terminal identification information for identifying the communication terminal determined to be connected is stored in a storage unit, the storage unit storing terminal identification information for identifying a QoS terminal, the QoS terminal being the communication terminal requesting application of QoS;

determining, when the terminal identification information is stored in the storage unit, whether the communication terminal determined to be connected satisfies the condition included in the connection condition; and outputting, when the communication terminal does not satisfy the connection condition, the output information indicating that the connection condition is not satisfied.

* * * * *